United States Patent
Suzuki et al.

(10) Patent No.: US 9,769,015 B2
(45) Date of Patent: Sep. 19, 2017

(54) NETWORK MANAGEMENT SERVER AND RECOVERY METHOD

(71) Applicant: HITACHI, LTD., Tokyo (JP)

(72) Inventors: Toshiaki Suzuki, Tokyo (JP); Hideki Endo, Tokyo (JP); Hidenori Inouchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 35 days.

(21) Appl. No.: 14/536,255

(22) Filed: Nov. 7, 2014

(65) Prior Publication Data

US 2015/0143184 A1    May 21, 2015

(30) Foreign Application Priority Data

Nov. 15, 2013 (JP) .................................. 2013-236808

(51) Int. Cl.
  *G06F 11/00* (2006.01)
  *H04L 12/24* (2006.01)
  *H04L 12/707* (2013.01)

(52) U.S. Cl.
  CPC ...... *H04L 41/0668* (2013.01); *H04L 41/0654* (2013.01); *H04L 41/0659* (2013.01); *H04L 45/22* (2013.01)

(58) Field of Classification Search
  CPC .. H04B 1/74; H04Q 3/00; H04L 12/56; H04L 41/0654; H04L 45/22
  See application file for complete search history.

(56) References Cited

U.S. PATENT DOCUMENTS

| | | | |
|---|---|---|---|
| 5,226,037 A | | 7/1993 | Satomi et al. |
| 5,724,341 A | * | 3/1998 | Inoue ...................... H04B 1/74 370/221 |

(Continued)

FOREIGN PATENT DOCUMENTS

| | | |
|---|---|---|
| JP | 4-117741 A | 4/1992 |
| JP | 2003-224587 A | 8/2003 |

(Continued)

OTHER PUBLICATIONS

Japanese Office Action received in corresponding Japanese Application No. 2013-236808 dated Jun. 13, 2017.

*Primary Examiner* — Bryce Bonzo
*Assistant Examiner* — Jonathan Gibson
(74) *Attorney, Agent, or Firm* — Mattingly & Malur, PC

(57) ABSTRACT

A network management server stores, in terms of a transmission path within the network, each occurrence pattern of a failure occurrence area in which a failure has occurred in a communication apparatus through which the transmission path passes. Information for identifying a recovery plane serving as a set of recovery paths corresponding to each occurrence pattern and information for identifying the communication apparatus through which each of the recovery paths passes is also stored. When a failure occurs in any one of the plurality of areas, whether or not the failure corresponds to any one of the failure occurrence patterns, the information for identifying the recovery plane corresponding to the identified failure occurrence patterns is acquired; and the communication apparatus through which each of the recovery paths included in the recovery plane passes is notified of the information for identifying the recovery plane acquired.

13 Claims, 27 Drawing Sheets

(56) References Cited

U.S. PATENT DOCUMENTS

| | | | |
|---|---|---|---|
| 6,850,997 B1* | 2/2005 | Rooney | G06F 11/201 340/1.1 |
| 2004/0001449 A1* | 1/2004 | Rostron | G06F 11/1489 370/282 |
| 2006/0164976 A1* | 7/2006 | Grover | H04L 45/00 370/228 |
| 2006/0182033 A1 | 8/2006 | Chen et al. | |
| 2013/0010610 A1* | 1/2013 | Karthikeyan | H04L 12/2423 370/242 |
| 2013/0182559 A1 | 7/2013 | Fujioka et al. | |
| 2013/0272116 A1 | 10/2013 | Fujihira et al. | |
| 2014/0029438 A1* | 1/2014 | Jain | H04L 41/0668 370/238 |

FOREIGN PATENT DOCUMENTS

| | | |
|---|---|---|
| JP | 2006-229967 A | 8/2006 |
| JP | 2013-046322 A | 3/2013 |
| JP | 2013-085061 A | 5/2013 |
| WO | 2010/018755 A1 | 2/2010 |

\* cited by examiner

| FAILURE PATTERN | RECOVERY PLANE ID | PATH | RECOVERY SETTING (APPARATUS THROUGH WHICH PATH PASSES) |
|---|---|---|---|
| NO AREA FAILURE | ACTIVE-SYSTEM RECOVERY PLANE 0 | P1 | 101, 14, 11, 51, 61, 62, 71, 31, 34, 103 |
| | | P2 | 102, 23, 22, 62, 71, 72, 82, 42, 43, 104 |
| FAILURE IN AREA 1 | RECOVERY PLANE 1 | P1 | 101, 24, 21, 22, 62, 71, 31, 34, 103 |
| | | P2 | 102, 23, 22, 62, 71, 72, 82, 2, 43, 104 |
| FAILURE IN AREA 2 | RECOVERY PLANE 2 | P1 | 101, 14, 11, 51, 61, 62, 71, 31, 34, 103 |
| | | P2 | 102, 13, 12, 61, 62, 71, 72, 82, 42, 43, 104 |
| ⋮ | ⋮ | ⋮ | ⋮ |
| FAILURES IN AREAS 2 AND 6 | RECOVERY PLANE 19 | P1 | 101, 14, 11, 51, 52, 81, 32, 31, 34, 103 |
| | | P2 | 102, 13, 12, 11, 51, 52, 81, 82, 42, 43, 104 |
| ⋮ | ⋮ | ⋮ | ⋮ |
| FAILURES IN ALL AREAS | RECOVERY PLANE 255 | P1 | UNRECOVERABLE |
| | | P2 | UNRECOVERABLE |

*FIG. 5*

| RECOVERY PLANE | COMMUNICATION APPARATUS, TERMINAL | PATH | COUPLING DESTINATION | COUPLING DESTINATION |
|---|---|---|---|---|
| ACTIVE SYSTEM (RECOVERY PLANE 0) | 11 | P1 | 14 | 51 |
| | 14 | P1 | 101 | 11 |
| | 22 | P2 | 23 | 62 |
| | 23 | P2 | 102 | 22 |
| | 31 | P1 | 71 | 34 |
| | 34 | P1 | 31 | 103 |
| | 42 | P2 | 82 | 43 |
| | 43 | P2 | 42 | 104 |
| | 51 | P1 | 11 | 61 |
| | 61 | P1 | 51 | 62 |
| | 62 | P1 | 61 | 71 |
| | | P2 | 22 | 71 |
| | 71 | P1 | 62 | 31 |
| | | P2 | 62 | 72 |
| | 72 | P2 | 71 | 82 |
| | 82 | P2 | 72 | 42 |
| | 101 | P1 | — | 14 |
| | 102 | P2 | — | 23 |
| | 103 | P1 | 34 | — |
| | 104 | P2 | 43 | — |

*FIG. 6*

| RECOVERY PLANE | COMMUNICATION APPARATUS, TERMINAL | PATH | COUPLING DESTINATION | COUPLING DESTINATION |
|---|---|---|---|---|
| RECOVERY PLANE 1 (FAILURE IN AREA 1) | 21 | P1 | 24 | 22 |
| | 22 | P1 | 21 | 62 |
| | | P2 | 23 | 62 |
| | 23 | P2 | 102 | 22 |
| | 24 | P1 | 101 | 21 |
| | 31 | P1 | 71 | 34 |
| | 34 | P1 | 31 | 103 |
| | 42 | P2 | 82 | 43 |
| | 43 | P2 | 42 | 104 |
| | 62 | P1 | 22 | 71 |
| | | P2 | 22 | 71 |
| | 71 | P1 | 62 | 31 |
| | | P2 | 62 | 72 |
| | 72 | P2 | 71 | 82 |
| | 82 | P2 | 72 | 42 |
| | 101 | P1 | — | 24 |
| | 102 | P2 | — | 23 |
| | 103 | P1 | 34 | — |
| | 104 | P2 | 43 | — |

*FIG. 7*

| RECOVERY PLANE | COMMUNICATION APPARATUS, TERMINAL | PATH | COUPLING DESTINATION | COUPLING DESTINATION |
|---|---|---|---|---|
| RECOVERY PLANE 2 (FAILURE IN AREA 2) | 11 | P1 | 14 | 51 |
| | 12 | P2 | 13 | 61 |
| | 13 | P2 | 102 | 12 |
| | 14 | P1 | 101 | 11 |
| | 31 | P1 | 71 | 34 |
| | 34 | P1 | 31 | 103 |
| | 42 | P2 | 82 | 43 |
| | 43 | P2 | 42 | 104 |
| | 51 | P1 | 11 | 61 |
| | 61 | P1 | 51 | 62 |
| | | P2 | 12 | 62 |
| | 62 | P1 | 61 | 71 |
| | | P2 | 61 | 71 |
| | 71 | P1 | 62 | 31 |
| | | P2 | 62 | 72 |
| | 72 | P2 | 71 | 82 |
| | 82 | P2 | 72 | 42 |
| | 101 | P1 | — | 14 |
| | 102 | P2 | — | 13 |
| | 103 | P1 | 34 | — |
| | 104 | P2 | 43 | — |

*FIG. 8*

| RECOVERY PLANE | COMMUNICATION APPARATUS, TERMINAL | PATH | COUPLING DESTINATION | COUPLING DESTINATION |
|---|---|---|---|---|
| RECOVERY PLANE 19 (FAILURES IN AREAS 2 AND 6) | 11 | P1 | 14 | 51 |
| | | P2 | 12 | 51 |
| | 12 | P2 | 13 | 11 |
| | 13 | P2 | 102 | 12 |
| | 14 | P1 | 101 | 11 |
| | 31 | P1 | 32 | 34 |
| | 32 | P1 | 81 | 31 |
| | 34 | P1 | 31 | 103 |
| | 42 | P2 | 82 | 43 |
| | 43 | P2 | 42 | 104 |
| | 51 | P1 | 11 | 52 |
| | | P2 | 11 | 52 |
| | 52 | P1 | 51 | 81 |
| | | P2 | 51 | 81 |
| | 81 | P1 | 52 | 32 |
| | | P2 | 52 | 82 |
| | 82 | P2 | 81 | 42 |
| | 101 | P1 | — | 14 |
| | 102 | P2 | — | 13 |
| | 103 | P1 | 34 | — |
| | 104 | P2 | 43 | — |

FIG. 9

| APPARATUS | RECOVERY PLANE | PATH | COUPLING DESTINATION | COUPLING DESTINATION |
|---|---|---|---|---|
| COMMUNICATION APPARATUS 31 | 0 (ACTIVE SYSTEM) | P1 | 71 | 34 |
| | 1 | P1 | 71 | 34 |
| | 2 | P1 | 71 | 34 |
| | 19 | P1 | 32 | 34 |
| | ⋮ | ⋮ | ⋮ | ⋮ |

FIG. 10

| APPARATUS | RECOVERY PLANE | PATH | COUPLING DESTINATION | COUPLING DESTINATION |
|---|---|---|---|---|
| COMMUNICATION APPARATUS 42 | 0 (ACTIVE SYSTEM) | P2 | 82 | 43 |
| | 1 | P2 | 82 | 43 |
| | 2 | P2 | 82 | 43 |
| | 19 | P2 | 82 | 43 |
| | ⋮ | ⋮ | ⋮ | ⋮ |

FIG. 11

| APPARATUS | RECOVERY PLANE | PATH | COUPLING DESTINATION | COUPLING DESTINATION |
|---|---|---|---|---|
| COMMUNICATION APPARATUS 51 | 0 (ACTIVE SYSTEM) | P1 | 11 | 61 |
| | 2 | P1 | 11 | 61 |
| | 19 | P1 | 11 | 52 |
| | | P2 | 11 | 52 |
| | ⋮ | ⋮ | ⋮ | ⋮ |

FIG. 12

| APPARATUS | RECOVERY PLANE | PATH | COUPLING DESTINATION | COUPLING DESTINATION |
|---|---|---|---|---|
| TERMINAL 101 | 0 (ACTIVE SYSTEM) | P1 | — | 14 |
| | 1 | P1 | — | 24 |
| | 2 | P1 | — | 14 |
| | 19 | P1 | — | 14 |
| | ⋮ | ⋮ | ⋮ | ⋮ |

FIG. 13

| APPARATUS | RECOVERY PLANE | PATH | COUPLING DESTINATION | COUPLING DESTINATION |
|---|---|---|---|---|
| TERMINAL 102 | 0 (ACTIVE SYSTEM) | P2 | — | 23 |
| | 1 | P2 | — | 23 |
| | 2 | P2 | — | 13 |
| | 19 | P2 | — | 13 |
| | ⋮ | ⋮ | ⋮ | ⋮ |

FIG. 14

| APPARATUS | RECOVERY PLANE | PATH | COUPLING DESTINATION | COUPLING DESTINATION |
|---|---|---|---|---|
| TERMINAL103 | 0 (ACTIVE SYSTEM) | P1 | 34 | — |
| | 1 | P1 | 34 | — |
| | 2 | P1 | 34 | — |
| | 3 | P1 | 44 | |
| | 4 | P1 | 34 | |
| | 19 | P1 | 34 | — |
| | ⋮ | ⋮ | ⋮ | ⋮ |

*FIG. 15*

| APPARATUS | RECOVERY PLANE | PATH | COUPLING DESTINATION | COUPLING DESTINATION |
|---|---|---|---|---|
| TERMINAL104 | 0 (ACTIVE SYSTEM) | P2 | 43 | — |
| | 1 | P2 | 43 | — |
| | 2 | P2 | 43 | — |
| | 3 | P2 | 43 | |
| | 4 | P2 | 33 | |
| | 19 | P2 | 43 | — |
| | ⋮ | ⋮ | ⋮ | ⋮ |

*FIG. 16*

NETWORK MANAGEMENT SERVER AND RECOVERY METHOD

CLAIM OF PRIORITY

The present application claims priority from Japanese patent application JP 2013-236808 filed on Nov. 15, 2013, the content of which is hereby incorporated by reference into this application.

BACKGROUND OF THE INVENTION

This invention relates to a network management server for managing a network and a recovery method therefor.

Background arts of this technical field include JP 2013-46322 A, JP 2013-85061 A, and WO 2010/018755 A1. In the technology disclosed in JP 2013-46322 A, a network management system includes a plane management table for managing a transmission plane defined as a set of transmission paths within a transmission network. Further, the plane management table sets and manages not only a transmission plane (active plane) applied at a normal time but also at least one transmission plane (standby plane) applicable when a failure occurs in the transmission network. When a failure occurs in the transmission network, the network management system changes an applied plane to an appropriate transmission plane.

In the technology disclosed in JP 2013-85061 A, respective communication apparatus are classified into a plurality of areas, each of which includes an edge node through which an active path first passes and an edge node through which the active path last passes. The network management apparatus holds failure information including a value indicating whether or not a failure has occurred in each area, and also holds alternative path information including a value indicating a plurality of edge nodes, a value indicating an alternative area of each area, and a priority assigned to each alternative area. When it is determined that the failure has occurred in a first area based on the failure information, the network management apparatus identifies the alternative area of the first area based on the alternative path information. When it is determined that the failure has not occurred in the alternative area of the first area, the network management apparatus determines the alternative area of the first area as a second area through which the active path passes, determines two edges nodes included in the second area based on the alternative path information, and detects each communication apparatus through which the active path between the two edge nodes passes.

In the technology disclosed in WO 2010/018755 A1, a path generation module generates in advance standby path information to be used when a failure occurs based on predicted topology information and predicted resource information, which are changed in accordance with a predicted failure site. The path generation module stores the generated standby path information in a data storage unit. A path information notification module of a transport control server (TCS) (S-1) notifies a node N of generated normal path information. A failure information acquisition module of the TCS (S-1) detects an occurrence of a failure. When the failure information acquisition module detects the occurrence of a failure, the path information notification module notifies the node N of the standby path information stored in the data storage unit.

However, in the technology disclosed in JP 2013-46322 A, when a failure has occurred in a specific set path, it is determined whether or not the path is available, for all the paths that pass through a plurality of relay points in the standby plane, and the standby plane affected least by the failure is selected based on the priorities of the respective paths. Therefore, it is necessary to execute a considerable amount of processing from the detection of the failure in the set path until the determination of the standby plane for recovery. Accordingly, it is more difficult to apply the technology to a communication system having a larger scale.

In the technology disclosed in JP 2013-85061 A, when a failure is detected in the area to which the communication apparatus belongs, already-set path settings for the paths passing through the area that has caused the failure are abolished one by one in order, and then path settings as bypasses are enabled. Therefore, it is necessary to execute a considerable amount of processing until all the already-set paths are recovered, and because the bypasses are determined and set one by one, the path settings optimal as a whole cannot be executed. Accordingly, it is more difficult to apply the technology to a communication system having a larger scale.

In the technology disclosed in WO 2010/018755 A1, the standby path information to be used when a failure occurs is calculated in advance, and each node is notified of different standby path information or a different ID indicating the path information. Therefore, when a large number of nodes exist, it is necessary to notify each node of an enormous number of different pieces of path information or necessary to establish coupling to the large number of nodes to be notified and notify the nodes of the large number of different IDs, which imposes a heavy load on the side that notifies of the path information or necessitates much time for the notification. Accordingly, it is more difficult to realize quick recovery for a communication system having a larger scale.

SUMMARY OF THE INVENTION

It is an object of this invention to realize reduction of load required for setting for quickly recovering an existing set path when a failure occurs in a communication system.

An aspect of the invention disclosed in this application is a network management server to be coupled to communication apparatus within respective areas of an area group forming a network, the network management server comprising: a processor for executing a program; a memory for storing the program to be executed by the processor; an interface for controlling communications to/from each of the communication apparatus; and a storage for storing data, wherein: the storage stores, in terms of a transmission path within the network, for each occurrence pattern of a failure occurrence area in which a failure has occurred in the communication apparatus among a plurality of areas through which the transmission path passes: information for identifying a recovery plane serving as a set of recovery paths corresponding to the each occurrence pattern; and information for identifying the communication apparatus through which each of the recovery paths passes, in association with each other; the communication apparatus each store recovery information comprising: information for identifying the recovery plane serving as the set of recovery paths passing through an own apparatus; and information for designating coupling counterparts to which the own apparatus is to be coupled in each of the recovery paths passing through the own apparatus; and the network management server executes: an identification procedure of identifying, when a failure occurs in any one of the plurality of areas, whether or not the failure corresponds to any one of failure occurrence patterns; an acquisition procedure of acquiring the information for identifying the recovery plane corresponding to the one of failure occurrence patterns identified in the identification procedure from the storage; and a notification procedure of notifying the communication apparatus through which each of the recovery paths included in the recovery plane passes of the information for identifying the recovery plane acquired in the acquisition procedure.

According to the exemplary embodiment of this invention, load required for setting for quickly recovering an existing set path when a failure occurs in a communication system can be reduced. Other objects, configurations, and effects than those described above are clarified by the following description of an embodiment.

BRIEF DESCRIPTION OF THE DRAWINGS

FIG. 5 is an explanatory diagram showing a storage content example of a recovery plane list table.

FIG. 6 is explanatory diagram showing a storage content example 1 of a path coupling setting table showing the coupling relations between the transmission apparatus for each recovery plane.

FIG. 7 is explanatory diagram showing a storage content example 2 of a path coupling setting table showing the coupling relations between the transmission apparatus for each recovery plane.

FIG. 8 is explanatory diagram showing a storage content example 3 of a path coupling setting table showing the coupling relations between the transmission apparatus for each recovery plane.

FIG. 9 is explanatory diagram showing a storage content example 4 of a path coupling setting table showing the coupling relations between the transmission apparatus for each recovery plane.

FIG. 10 is explanatory diagram showing a storage content example 1 of a recovery path setting list table for each recovery plane corresponding to each transmission apparatus.

FIG. 11 is explanatory diagram showing a storage content example 2 of a recovery path setting list table for each recovery plane corresponding to each transmission apparatus.

FIG. 12 is explanatory diagram showing a storage content example 3 of a recovery path setting list table for each recovery plane corresponding to each transmission apparatus.

FIG. 13 is explanatory diagram showing a storage content example 4 of a recovery path setting list table for each recovery plane corresponding to each transmission apparatus.

FIG. 14 is explanatory diagram showing a storage content example 5 of a recovery path setting list table for each recovery plane corresponding to each transmission apparatus.

FIG. 15 is explanatory diagram showing a storage content example 6 of a recovery path setting list table for each recovery plane corresponding to each transmission apparatus.

FIG. 16 is explanatory diagram showing a storage content example 7 of a recovery path setting list table for each recovery plane corresponding to each transmission apparatus.

DETAILED DESCRIPTION OF THE PREFERRED EMBODIMENTS

First Embodiment

A first embodiment of this invention is described by taking an example in which an entire network is partitioned into a plurality of areas and a failure is managed in units of areas to quickly recover a set transmission path at an occurrence of a failure. Further, the first embodiment is described by taking an example in which a communication system forms a packet transport network.

<Network Configuration Example>

Figure 1:
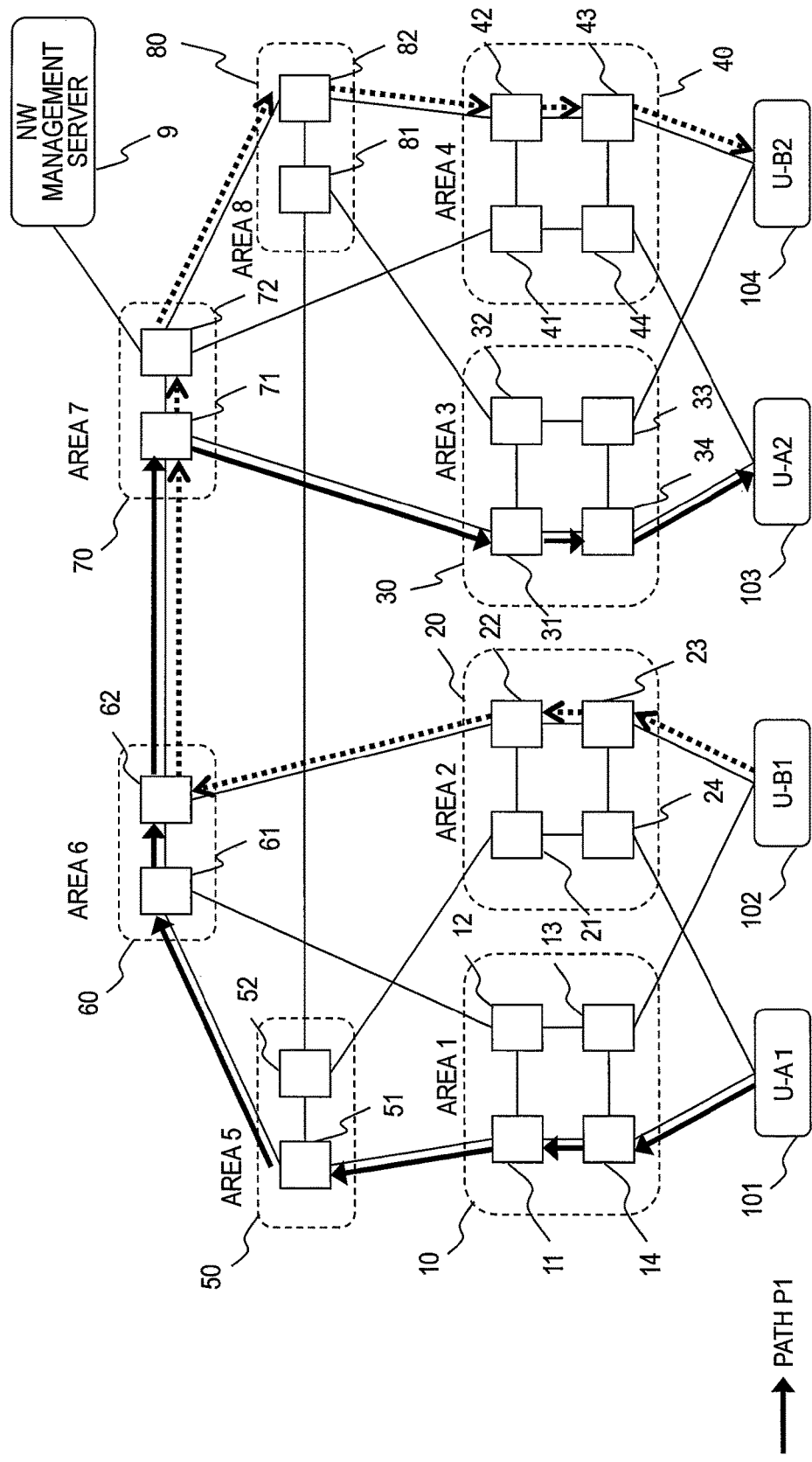
FIG. 1 is an explanatory diagram illustrating a system configuration example of a communication system according to the first embodiment.

FIG. 1 is an explanatory diagram illustrating a system configuration example of a communication system according to the first embodiment. The communication system according to the first embodiment includes a network management server 9, communication apparatus 11 to 14, 21 to 24, 31 to 34, 41 to 44, 51 and 52, 61 and 62, 71 and 72, and 81 and 82, and terminals 101 to 104, to form a network. It should be noted that servers, other communication apparatus, or networks may be employed instead of the terminals, but this example is described by taking the terminals as an example. It should be noted that the communication apparatus and the terminals (including servers) are collectively referred to as "transmission apparatus". Further, in FIG. 1, for the sake of convenience, the network management server 9 is coupled only to the communication apparatus 72, but is also coupled to other communication apparatus.

In the first embodiment, the communication apparatus 11 to 14 form an area "1", the communication apparatus 21 to 24 form an area "2", the communication apparatus 31 to 34 form an area "3", the communication apparatus 41 to 44 form an area "4", the communication apparatus 51 and 52 form an area "5", the communication apparatus 61 and 62 form an area "6", the communication apparatus 71 and 72 form an area "7", and the communication apparatus 81 and 82 form an area "8".

Further, in the first embodiment, a transmission path P1 (passing through the terminal 101, the communication apparatus 14, 11, 51, 61, 62, 71, 31, and 34, and the terminal 103) and a transmission path P2 (passing through the terminal 102, the communication apparatus 23, 22, 62, 71, 72, 82, 42, and 43, and the terminal 104) are set at an operation start stage.

The network management server 9 calculates in advance, for a set transmission path, a recovery path to be used when a failure occurs in units of areas. In the first embodiment, eight areas exist, and hence the number of failure occurrence patterns in units of areas is $2^8=256$. There are one state in which a failure has occurred in none of the areas, eight states in which a failure has occurred in a given one area, twenty-eight states in which failures have occurred in given two areas, fifty-six states in which failures have occurred in given three areas, seventy states in which failures have occurred in given four areas, fifty-six states in which failures have occurred in given five areas, twenty-eight states in which failures have occurred in given six areas, eight states in which failures have occurred in given seven areas, and one state in which failures have occurred in all the areas.

The network management server 9 assigns an identifier (referred to as "recovery plane ID") for identifying a recovery plane to every failure pattern, and calculates the recovery path for an active-system path set at the operation start stage as shown in FIG. 5. The recovery plane represents a transmission plane defined as a set of recovery paths within the network. Further, the network management server 9 calculates a recovery setting for paths (recovery plane) indicating coupling relations between transmission apparatus which form the recovery plane corresponding to an area failure pattern as shown in FIG. 6 to FIG. 9. In addition, the network management server 9 calculates a recovery setting for a path (recovery plane) for each transmission apparatus, and notifies each apparatus of a table obtained by the calculation as shown in FIG. 10 to FIG. 16. Each transmission apparatus holds the received table for path recovery for each recovery plane.

After notifying each transmission apparatus of a recovery path setting table for each recovery plane, the network management server 9 monitors whether or not a failure has occurred in a communication apparatus within the communication system. Then, the network management server 9 determines whether or not a failure has occurred in units of areas, selects the recovery plane corresponding to the determined failure pattern, and notifies each transmission apparatus of the same recovery plane ID for set path recovery. In the first embodiment, the same ID for the identified recovery plane is transmitted to all the transmission apparatus relating to failure recovery, and hence the network management server 9 does not need to notify the individual transmission apparatus of different pieces of information.

Therefore, for example, with a multicast network for management control built between the network management server 9 and all the transmission apparatus, the network management server 9 can instruct the entire communication system to recover by transmitting the recovery plane ID for the failure recovery for one time. When a failure occurs, the respective transmission apparatus perform the recovery setting for the set path in accordance with the recovery plane ID notified of by the network management server 9, and execute transmission of the received data.

Figure 2:
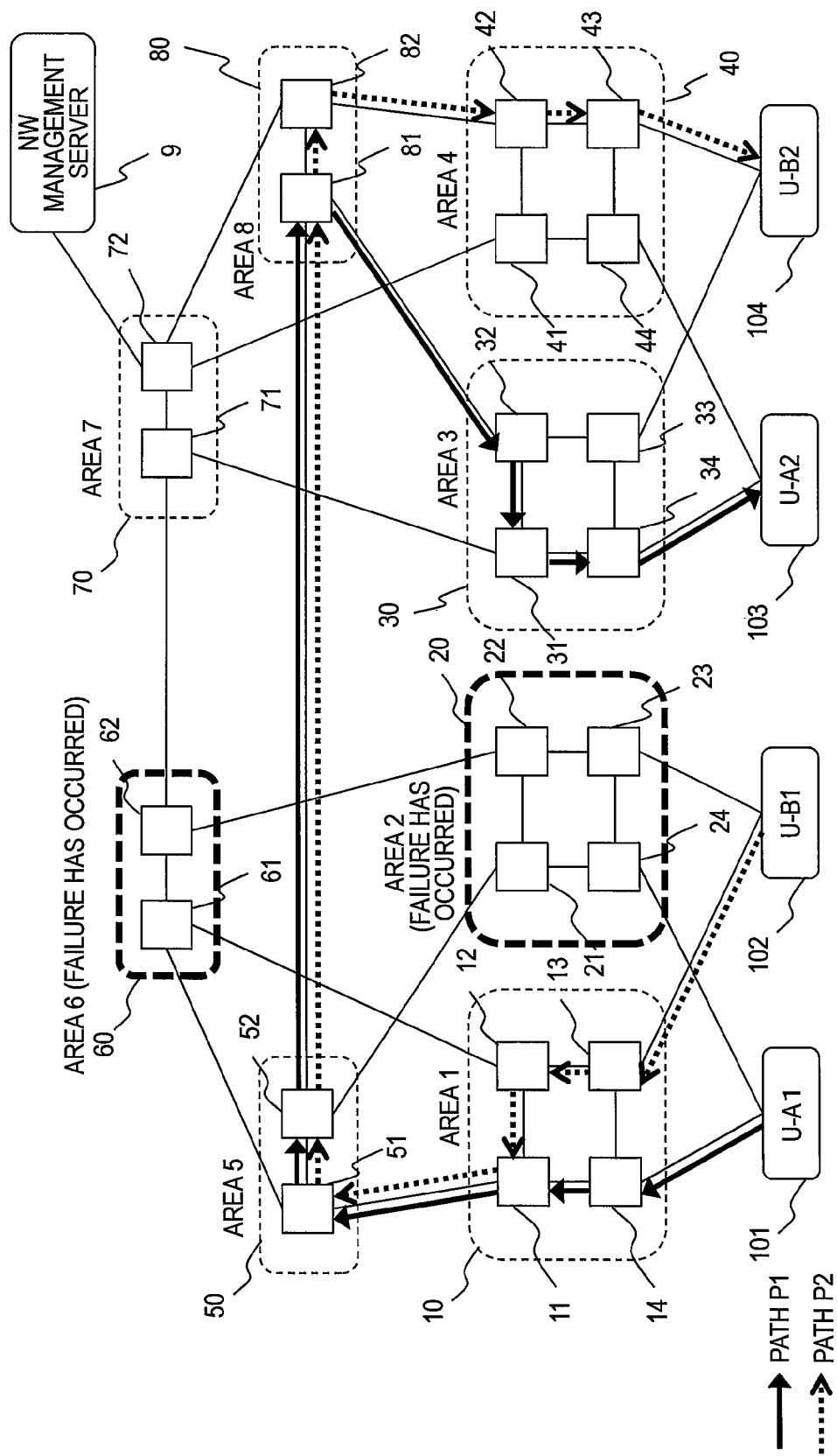
FIG. 2 is an explanatory diagram illustrating a system configuration example of a communication system after the failure recovery according to the first embodiment.

FIG. 2 is an explanatory diagram illustrating a system configuration example of a communication system after the failure recovery according to the first embodiment. The network management server 9 illustrated in FIG. 2 monitors whether or not a failure has occurred in all the communication apparatus within the communication system, and monitors whether or not a failure has occurred in units of areas. The first embodiment is described by taking as an example of a case where failures have occurred in the area "2" and the area "6". When a large-scale disaster occurs or in other such case, it is assumed that a plurality of areas are damaged substantially simultaneously. The first embodiment is described on the assumption of such a case, in other words, a case where failures have occurred in two areas with a slight time difference therebetween.

The network management server 9 monitors the operations of the communication apparatus 61, 62, 21, 22, 23, and 24 illustrated in FIG. 2, and when the operations of those communication apparatus are not confirmed, determines that failures have occurred in the area "2" and the area "6". It should be noted that in the first embodiment, the operation of the communication apparatus is monitored to determine whether or not a failure has occurred in the communication apparatus and the area, but a link for coupling the communication apparatus to each other may be subjected to failure monitor, to thereby determine whether or not an area failure has occurred based on a link failure in at least one link coupled to another area.

In the first embodiment, the network management server 9 detects failures in the area "2" and the area "6", selects the recovery plane corresponding to those area failures, and notifies the transmission apparatus within the communication system of the recovery plane ID for notifying of the recovery plane. The multicast network is used as the network for the management control, and all the transmission apparatus are notified of the same ID for recovery. It should be noted that only the transmission apparatus related to the recovery plane may be individually notified of the recovery plane ID without using the multicast network as the network for the management control. This allows the transmission apparatus related to the recovery plane to be identified with ease.

In the first embodiment, in which it is assumed that failures have occurred in the area "2" and the area "6", the network management server 9 notifies the communication apparatus 51, 52, 81, 32, and 31, the terminal 102, and the communication apparatus 13, 12, 11, 51, 52, 81, and 82 of the ID indicating the recovery plane. The transmission apparatus that has received the recovery plane ID carries out the following setting change.

The communication apparatus 51 switches the coupling of the transmission path P1 from the communication apparatus 61 to the communication apparatus 52. The communication apparatus 52 transmits the data received from the communication apparatus 51 to the communication apparatus 81. The communication apparatus 81 transmits the data received from the communication apparatus 52 to the communication apparatus 32. The communication apparatus 32 transmits the data received from the communication apparatus 81 to the communication apparatus 31. The communication apparatus 31 transmits the data received from the communication apparatus 32 to the communication apparatus 34. The transmission path P1 is switched in the above-mentioned manner from the transmission path P1 set at a communication system start stage, to thereby couple the terminal 101 to the terminal 103 through the communication apparatus 14, 11, 51, 52, 81, 32, 31, and 34. It should be noted that, although not shown, the same setting is applied to a communication in a reverse direction from the terminal 103 to the terminal 101.

Further, the terminal 102 switches the coupling of the transmission path P2 from the communication apparatus 23 to the communication apparatus 13. The communication apparatus 13 transmits the data received from the terminal 102 to the communication apparatus 12. The communication apparatus 12 transmits the data received from the communication apparatus 13 to the communication apparatus 11. The communication apparatus 11 transmits the data received from the communication apparatus 12 to the communication apparatus 51. The communication apparatus 51 transmits the data received from the communication apparatus 11 to the communication apparatus 52. The communication apparatus 52 transmits the data received from the communication apparatus 51 to the communication apparatus 81. The communication apparatus 81 transmits the data received from the communication apparatus 52 to the communication apparatus 82. The communication apparatus 82 transmits the data received from the communication apparatus 81 to the communication apparatus 42. The transmission path P2 is switched in the above-mentioned manner from the transmission path P2 set at the communication system start stage, to thereby couple the terminal 102 to the terminal 104 through the communication apparatus 13, 12, 11, 51, 52, 81, 82, 42, and 43. It should be noted that, although not shown, the same setting is applied to a communication in a reverse direction from the terminal 104 to the terminal 102.

As described above, the failure monitor is performed in units of areas by the network management server 9, and when a failure occurs in the area being monitored, the recovery plane ID for recovering from the failure is notified of, to thereby allow quick recovery from the failure.

It should be noted that the first embodiment is described by assuming that the same network is used for all the coupling networks, but the network coupling between the terminal and the area may be set to differ in type from the network coupling between the areas. For example, the network coupling between the areas may be a multi-protocol label switching-transport profile (MPLS-TP) network, while the network coupling between the terminal and the communication apparatus within the area may be an Internet protocol (IP) network.

<Failure Recovery Sequence Example>

Figure 3:
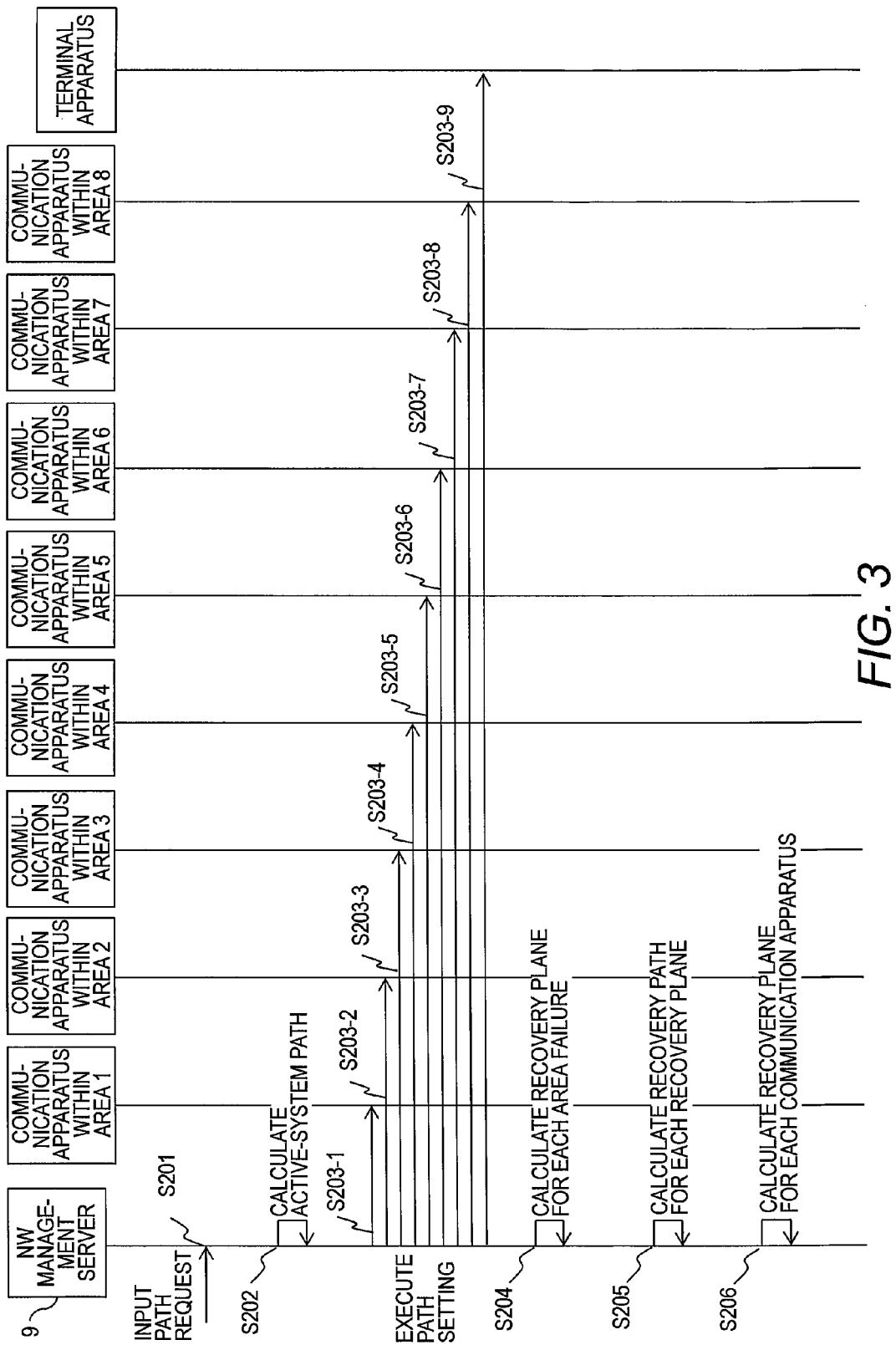
FIG. 3 is a sequence diagram (first half) illustrating a flow of the failure recovery according to the first embodiment.

FIG. 3 is a sequence diagram (first half) illustrating a flow of the failure recovery according to the first embodiment. The network management server 9 receives a path setting input from a network administrator or the like (Step S201). The network management server 9 calculates the set path for each of the communication apparatus to be operated as an active system in accordance with the input path setting (Step S202). The network management server 9 notifies the communication apparatus and the terminal existing within each area of the calculated path setting for each of the communication apparatus, and executes the setting of the path to be operated as the active system (Steps S203-1 to S203-9).

It should be noted that in the setting of the transmission path P1 and the transmission path P2 illustrated in FIG. 1, the transmission apparatus relating to a transmission path setting are notified of the transmission path setting. Specifically, in the setting of the transmission path P1, the communication apparatus 14, 11, 51, 61, 62, 71, 31, and 34 and the terminals 101 and 103 are notified of the path setting. Further, in the setting of the transmission path P2, the communication apparatus 23, 22, 62, 71, 72, 82, 42, and 43 and the terminals 102 and 104 are notified of the path setting.

Subsequently to Step S203, the network management server 9 executes calculation of the recovery plane formed of a path list for recovering the active-system path for each area failure pattern (Step S204). It should be noted that in the first embodiment, the calculation of the recovery plane is performed for all the conceivable area failure patterns, but may be performed only for the failure pattern of a specific area.

Subsequently to Step S204, the network management server 9 calculates recovery path setting data for each recovery plane from the calculated data on the recovery plane for each area failure pattern (Step S205). An example of calculation results thereof is as shown in FIG. 6 to FIG. 8. Subsequently to Step S205, from the calculated recovery path setting data for each recovery plane, the network management server 9 calculates the recovery path setting data for each transmission apparatus and for each recovery plane (Step S206). An example of calculation results thereof is as shown in FIG. 10 to FIG. 16.

Figure 4:
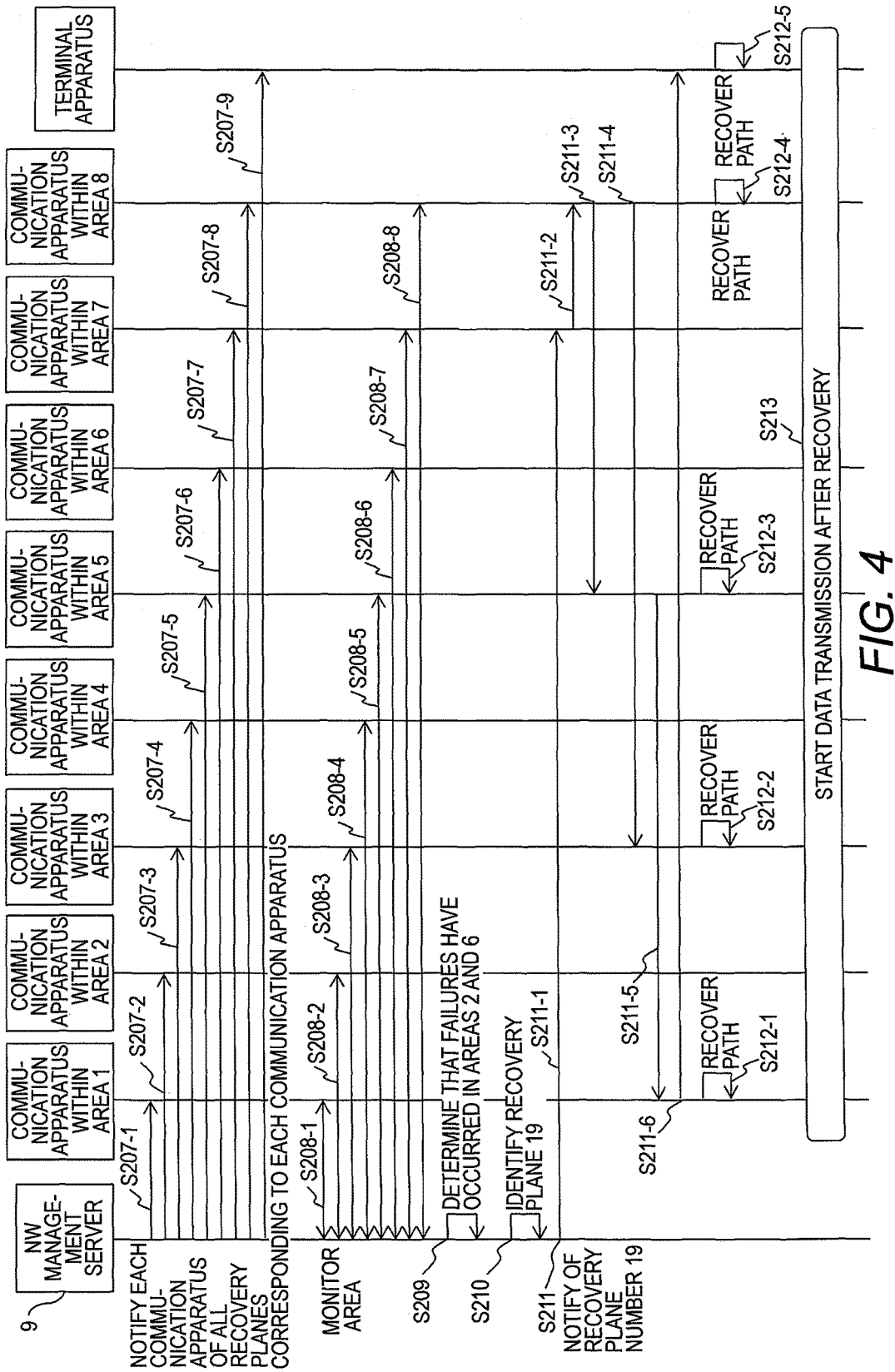
FIG. 4 is a sequence diagram (second half) illustrating a flow of the failure recovery according to the first embodiment.

FIG. 4 is a sequence diagram (second half) illustrating a flow of the failure recovery according to the first embodiment. Subsequently to Step S206, the network management server 9 notifies the respective transmission apparatus of the recovery path setting data for each recovery plane calculated in Step S206 (Steps S207-1 to S207-9). Subsequently to Step S207, the network management server 9 starts the failure monitor in units of areas (Steps S208-1 to S208-8). In the monitor of the area performed in Step S208, when detecting that the operations of the communication apparatus within the area "2" and the area "6" have stopped, the network management server 9 determines that failures have occurred in the area "2" and the area "6" (Step S209). It should be noted that in the first embodiment, it is determined that an area failure has occurred by detecting that the operations of all the communication apparatus within the area have stopped, but it may be determined that the area failure has occurred when detecting that the operation of at least one communication apparatus within the area has stopped. Further, in the first embodiment, it is determined that a failure has occurred in the area based on whether or not the operation of the communication apparatus has stopped, but the failure monitor may be performed for the links coupling between the communication apparatus, and it may be determined that an area failure has occurred based on the link failure in at least one link coupled to another area.

Subsequently to Step S209, the network management server 9 identifies the recovery plane to be used when failures occur in the area "2" and the area "6" (Step S210). Here, for example, the network management server 9 identifies the recovery plane "19" to be used when a failure occurs in the area "2" and the area "6". Subsequently to Step S210, the network management server 9 notifies the transmission apparatus relating to the recovery setting for the path of the identified recovery plane ID (19) (Steps S211-1 to S211-6). Specifically, for example, the network management server 9 notifies of the recovery plane ID by using the multicast network for the management control (not shown). It should be noted that in the first embodiment, the network management server 9 notifies the transmission apparatus relating to the recovery of the path of the recovery plane ID by using the multicast network, but may individually notify each of the transmission apparatus of the same recovery plane ID.

After Step S211, the transmission apparatus executes path recovery setting based on the recovery plane ID notified of by the network management server 9 and a path setting table for each recovery plane received and held in advance, and executes the transmission of the received data (Steps S212-1 to S212-5). After Step S212, the communication system starts data transmission after the recovery (Step S213). This completes the recovery.

<Storage Content Example of Various Tables>

FIG. 5 is an explanatory diagram showing a storage content example of a recovery plane list table. A recovery plane list table 500 is a table for storing the recovery plane serving as a list of the paths for recovering an active-system path for each area failure pattern. Specifically, the recovery plane list table 500 is a table for storing, in terms of the transmission path within the network, for each occurrence pattern (failure pattern) of a failure occurrence area in which a failure has occurred in the communication apparatus among a plurality of areas through which the transmission path passes: information (recovery plane ID and path) for identifying the recovery paths corresponding to the occurrence pattern; and information (recovery setting) for identifying the communication apparatus through which the recovery path passes, in association with each other.

The recovery plane list table 500 is a table created first in the calculation of the recovery plane of Step S204 illustrated in FIG. 3. As shown in FIG. 5, a situation in which a failure has occurred in none of the areas is managed as a currently operated system, and is set to have a recovery plane ID of "0". It should be noted that the recovery plane ID of "#" (# representing an integer equal to or greater than zero) is expressed as "recovery plane "#"".

The transmission path P1 of the recovery plane "0" is a path passing from the terminal 101 through the communication apparatus 14, 11, 51, 61, 62, 71, 31, and 34 to reach the terminal 103. Further, the transmission path P2 of the recovery plane "0" is a path passing from the terminal 102 through the communication apparatus 23, 22, 62, 71, 72, 82, 42, and 43 to reach the terminal 104. It should be noted that unidirectional transmission path setting is described for the transmission path P1 and the transmission path P2, but the transmission path setting for the reverse direction may be executed in the same manner.

In regard to the area failure, for example, when failures have occurred in the area "2" and the area "6", the network management server 9 refers to the recovery plane list table 500 to select the recovery plane "19" as the recovery plane. Further, in the recovery plane "19", the transmission path P1 is set as a path passing from the terminal 101 through the communication apparatus 14, 11, 51, 52, 81, 32, 31, and 34 to reach the terminal 103. In addition, in the recovery plane "19", the transmission path P2 is set as a path passing from the terminal 102 through the communication apparatus 13, 12, 11, 51, 52, 81, 82, 42, and 43 to reach the terminal 104.

Also for another area failure pattern in the area "1" and another area failure pattern in the area "2", the recovery plane "1" and the recovery plane "2" are set, respectively, and the recovery planes corresponding to all the other failure patterns are set in the same manner. It should be noted that in the first embodiment, in the calculation of the transmission path in the recovery plane, the selection is performed so as to avoid passing through the failure area, but another method may be employed, for example, the selection may be performed so as to achieve the shortest hop while avoiding passing through the failure area.

FIG. 6 to FIG. 9 are explanatory diagrams showing a storage content example of a path coupling setting table showing the coupling relations between the transmission apparatus for each recovery plane. The path coupling setting table of FIG. 6 shows a path coupling setting for each transmission apparatus in a case where there is no failure area, in other words, in the currently operated system (recovery plane "0"). The path coupling setting table of FIG. 6 is obtained by rearranging the data relating only to the recovery plane "0", which is acquired from the recovery plane list table 500 of FIG. 5, in terms of the transmission path setting for each transmission apparatus.

In the recovery plane "0", for example, the communication apparatus 11 indicates a path coupling setting in which the data received from the communication apparatus 14 is transmitted to the communication apparatus 51 while the data received from the communication apparatus 51 is transmitted to the communication apparatus 14 in terms of the transmission path P1. The terminal 101 indicates a path coupling setting in which the data is transmitted to the communication apparatus 14 while the data is received from the communication apparatus 14. In the same manner, also for the other transmission apparatus, the path coupling settings are stored in the path coupling setting table of FIG. 6.

The path coupling setting table of FIG. 7 shows a recovery path coupling setting for each transmission apparatus in the recovery plane "1" in a case where a failure occurs in the area "1". The path coupling setting table of FIG. 7 is obtained by rearranging the data relating only to the recovery plane "1", which is acquired from the recovery plane list table 500 of FIG. 5, in terms of the transmission path setting for each transmission apparatus.

In the recovery plane "1", for example, the communication apparatus 24 indicates a recovery path coupling setting in which the data received from the terminal 101 is transmitted to the communication apparatus 21 while the data received from the communication apparatus 21 is transmitted to the terminal 101 in terms of the transmission path P1. The terminal 101 indicates a recovery path coupling setting in which the data is transmitted to the communication apparatus 24 while the data is received from the communication apparatus 24. In the same manner, also for the other transmission apparatus, the recovery path coupling settings are stored in the path coupling setting table of FIG. 7.

The path coupling setting table of FIG. 8 shows a recovery path coupling setting for each transmission apparatus in the recovery plane "2" in a case where a failure occurs in the area "2". The path coupling setting table of FIG. 8 is obtained by rearranging the data relating only to the recovery plane "2", which is acquired from the recovery plane list table 500 of FIG. 5, in terms of the transmission path setting for each transmission apparatus.

In the recovery plane "2", for example, the communication apparatus 13 indicates a recovery path coupling setting in which the data received from the terminal 102 is transmitted to the communication apparatus 12 while the data received from the communication apparatus 12 is transmitted to the terminal 102 in terms of the transmission path P2. The terminal 102 indicates a recovery path coupling setting in which the data is transmitted to the communication apparatus 13 while the data is received from the communication apparatus 13. In the same manner, also for the other transmission apparatus, the path coupling settings are stored in the path coupling setting table of FIG. 8.

The path coupling setting table of FIG. 9 shows a recovery path coupling setting for each transmission apparatus in the recovery plane "19" in a case where failures occur in the area "2" and the area "6". The path coupling setting table of FIG. 9 is obtained by rearranging the data relating only to the recovery plane "19", which is acquired from the recovery plane list table 500 of FIG. 5, in terms of the transmission path setting for each transmission apparatus.

In the recovery plane "19, for example, the communication apparatus 51 indicates a recovery path coupling setting in which the data received from the communication apparatus 11 is transmitted to the communication apparatus 52 while the data received from the communication apparatus 52 is transmitted to the communication apparatus 11 in terms of the transmission path P1. Further, the communication apparatus 51 indicates a recovery path coupling setting in which the data received from the communication apparatus 11 is transmitted to the communication apparatus 52 while the data received from the communication apparatus 52 is transmitted to the communication apparatus 11 in terms of the transmission path P2. In the same manner, also for the other transmission apparatus, the recovery path coupling settings are stored in the path coupling setting table of FIG. 9.

FIG. 10 to FIG. 16 are explanatory diagrams showing a storage content example of a recovery path setting list table for each recovery plane corresponding to each transmission apparatus. The recovery path setting list table shows recovery information including: information for identifying recovery paths passing through an own apparatus; and information for designating coupling counterparts to which the own apparatus is to be coupled in the recovery path passing through the own apparatus.

The recovery path setting list table of FIG. 10 shows a recovery path setting list for each recovery plane corresponding to the communication apparatus 31. For example, the recovery plane "19" indicates a recovery path setting in which the communication apparatus 31 transmits the data received from the communication apparatus 32 to the communication apparatus 34 while transmitting the data received from the communication apparatus 34 to the communication apparatus 32 in terms of the transmission path P1. In the same manner, also for the other recovery planes, the recovery path settings are stored in the recovery path setting list table of FIG. 10.

The recovery path setting list table of FIG. 11 shows a recovery path setting list for each recovery plane corresponding to the communication apparatus 42. For example, the recovery plane "19" indicates a recovery path setting in which the communication apparatus 42 transmits the data received from the communication apparatus 82 to the communication apparatus 43 while transmitting the data received from the communication apparatus 43 to the communication apparatus 82 in terms of the transmission path P2. In the same manner, also for the other recovery planes, the recovery path settings are stored in the recovery path setting list table of FIG. 11.

The recovery path setting list table of FIG. 12 shows a recovery path setting list for each recovery plane corresponding to the communication apparatus 51. For example, the recovery plane "19" indicates a recovery path setting in which the communication apparatus 51 transmits the data received from the communication apparatus 11 to the communication apparatus 52 while transmitting the data received from the communication apparatus 52 to the communication apparatus 11 in terms of the transmission path P1. Further, the communication apparatus 51 indicates a recovery path coupling setting in which the data received from the communication apparatus 11 is transmitted to the communication apparatus 52 while the data received from the communication apparatus 52 is transmitted to the communication apparatus 11 in terms of the transmission path P2. In the same manner, also for the other recovery planes, the recovery path settings are stored in the recovery path setting list table of FIG. 12.

The recovery path setting list table of FIG. 13 shows a recovery path setting list for each recovery plane corresponding to the terminal 101. For example, the recovery plane "19" indicates a recovery path setting in which the terminal 101 transmits the data to the communication apparatus 14 while receiving the data from the communication apparatus 14 in terms of the transmission path P1. In the same manner, also for the other recovery planes, the recovery path settings are stored in the recovery path setting list table of FIG. 13.

The recovery path setting list table of FIG. 14 shows a recovery path setting list for each recovery plane corresponding to the terminal 102. For example, the recovery plane "19" indicates a recovery path setting in which the terminal 102 transmits the data to the communication apparatus 13 while receiving the data from the communication apparatus 13 in terms of the transmission path P2. In the same manner, also for the other recovery planes, the recovery path settings are stored in the recovery path setting list table of FIG. 14.

The recovery path setting list table of FIG. 15 shows a recovery path setting list for each recovery plane corresponding to the terminal 103. For example, the recovery plane "19" indicates a recovery path setting in which the terminal 103 receives the data from the communication apparatus 34 while transmitting the data to the communication apparatus 34 in terms of the transmission path P1. In the same manner, also for the other recovery planes, the recovery path settings are stored in the recovery path setting list table of FIG. 15.

The recovery path setting list table of FIG. 16 shows a recovery path setting list for each recovery plane corresponding to the terminal 104. For example, the recovery plane "19" indicates a recovery path setting in which the terminal 104 receives the data from the communication apparatus 43 while transmitting the data to the communication apparatus 43 in terms of the transmission path P2. In the same manner, also for the other recovery planes, the recovery path settings are stored in the recovery path setting list table of FIG. 16.

<Hardware Configuration Example of Network Management Server 9>

Figure 17:
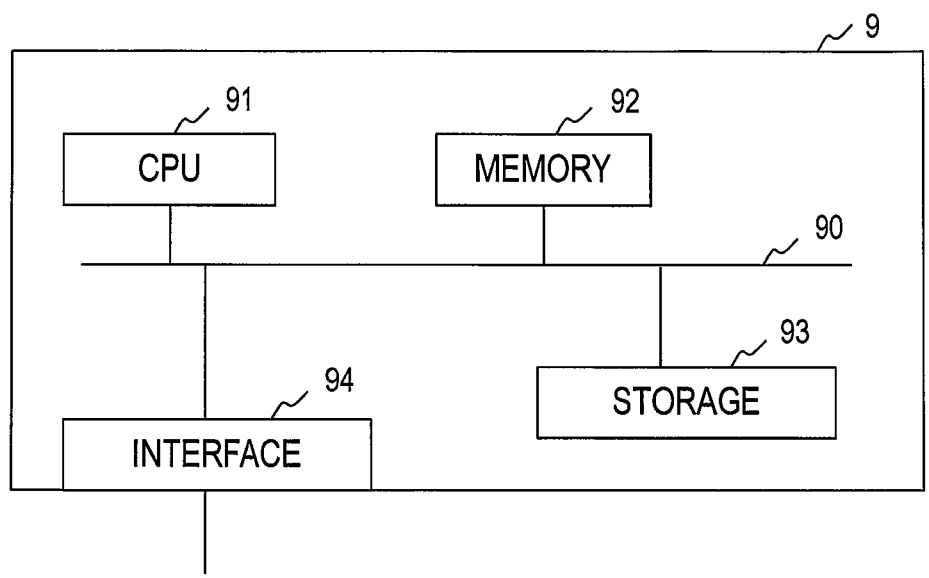
FIG. 17 is a block diagram illustrating a hardware configuration example of the network management server according to the first embodiment.

FIG. 17 is a block diagram illustrating a hardware configuration example of the network management server 9 according to the first embodiment. The network management server 9 includes a CPU 91, a memory 92, a storage 93, and a network interface 94, and the respective components are coupled to one another through a bus 90. The CPU 91 loads various programs stored in the storage 93 onto the memory 92 to execute the programs. The CPU 91 executes the programs, to thereby be able to implement functions provided to the network management server 9. The memory 92 stores the programs to be executed by the CPU 91 and data necessary to execute the programs. The programs and data stored in the memory 92 are described later with reference to FIG. 18. The network interface 94 is an interface for coupling to an external network. FIG. 17 illustrates one interface coupled to the external network, but a plurality of interfaces may be mounted.

Figure 18:
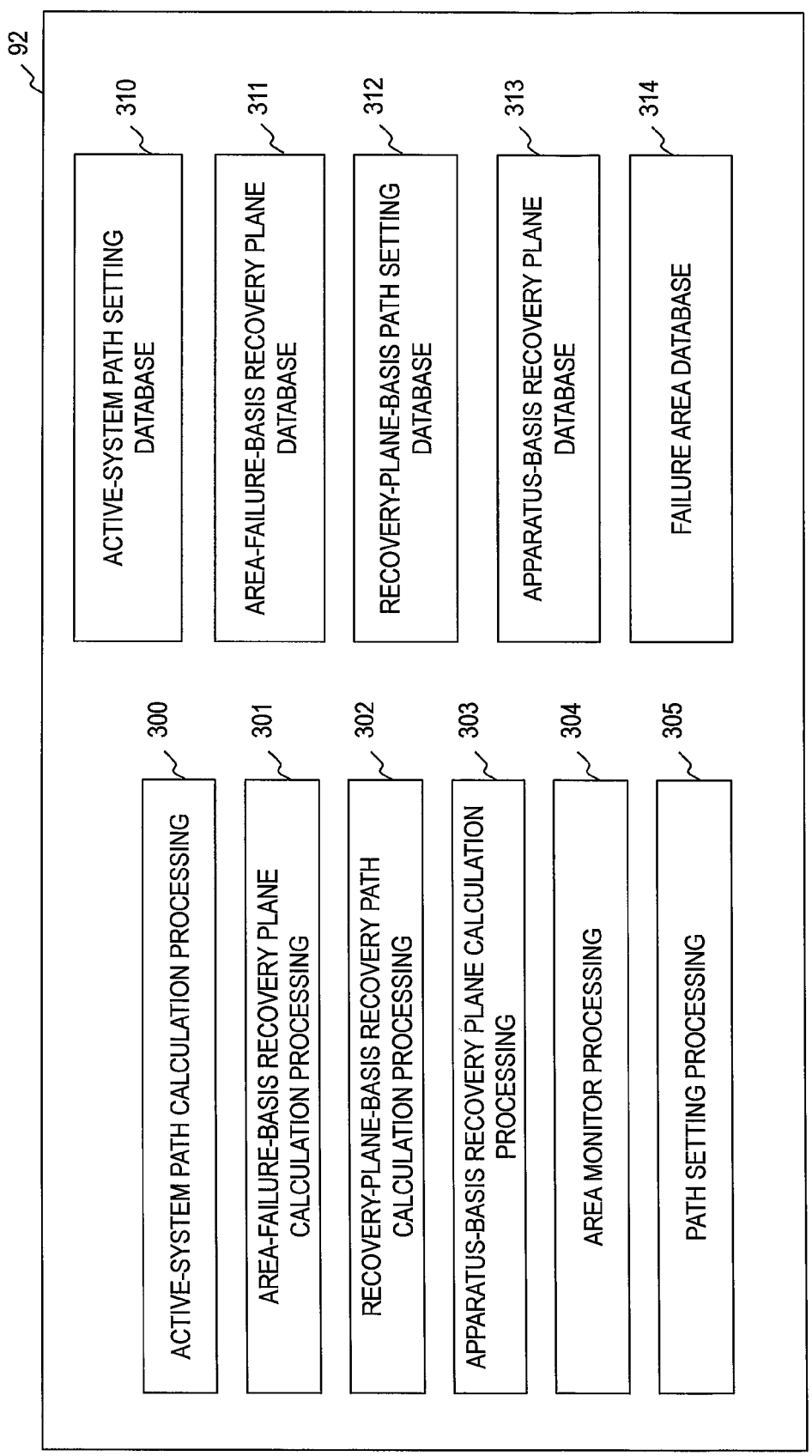
FIG. 18 is a block diagram illustrating a functional configuration example of the network management server according to the first embodiment.

FIG. 18 is a block diagram illustrating a functional configuration example of the network management server 9 according to the first embodiment. When the CPU 91 executes the programs stored in the memory, the network management server 9 executes active-system path calculation processing 300, area-failure-basis recovery plane calculation processing 301, recovery-plane-basis recovery path calculation processing 302, apparatus-basis recovery plane calculation processing 303, area monitor processing 304, and path setting processing 305.

In the active-system path calculation processing 300, a path setting input is received from the network administrator or the like, and the set path for the respective communication apparatus to be operated as the transmission path P1 for the active system is calculated in accordance with the input path setting, for example, an input of a path setting of 1 Gbps between the terminal 101 and the terminal 103. The calculated set path is held in the memory 92 as an active-system path setting database 310. In the first embodiment, the transmission path P1 passing from the terminal 101 through the communication apparatus 14, 11, 51, 61, 62, 71, 31, and 34 to reach the terminal 103 is set by the active-system path calculation processing 300. The setting is performed for the respective communication apparatus. It should be noted that between the terminal 101 and the terminal 103, the path setting may be performed bidirectionally with the same transmission quality, or may be performed unidirectionally with different transmission quality. Further, in the same manner, the active-system path calculation processing 300 sets the transmission path P2 between the terminal 102 and the terminal 104 as the transmission path P2.

In the area-failure-basis recovery plane calculation processing 301, setting for managing a plurality of communication apparatus collectively as areas is performed in the entire communication system in accordance with the input from the network administrator or the like. Further, in the area-failure-basis recovery plane calculation processing 301, the recovery plane formed of the path list for recovering the active-system path for each area failure pattern shown in FIG. 5 is calculated, and is held in the memory 92 as an area-failure-basis recovery plane database 311.

In the recovery-plane-basis recovery path calculation processing 302, the recovery path setting for each recovery plane shown in, for example, FIG. 6 to FIG. 9 is calculated from the area-failure-basis recovery plane database 311 calculated in the area-failure-basis recovery plane calculation processing 301, and is held in the memory 92 as a recovery-plane-basis path setting database 312.

In the apparatus-basis recovery plane calculation processing 303, the recovery path setting list table for each recovery plane corresponding to each transmission apparatus shown in, for example, FIG. 10 to FIG. 16 is calculated from the recovery-plane-basis path setting database 312 calculated in the recovery-plane-basis recovery path calculation processing 302, and is held in the memory 92 as an apparatus-basis recovery plane database 313.

In the area monitor processing 304, an operation situation of each communication apparatus is monitored, it is determined along with the detection of the occurrence of the failure whether or not a failure has occurred in units of areas, and failure information obtained in the communication apparatus and the area is held in the memory 92 as a failure area database 314.

In the path setting processing 305, the communication apparatus is notified of the path setting determined in the active-system path calculation processing and the recovery plane ID determined in the area monitor processing 304.

It should be noted that the processing flows of the area-failure-basis recovery plane calculation processing 301, the recovery-plane-basis recovery path calculation processing 302, and the apparatus-basis recovery plane calculation processing 303 are described with reference to flowcharts of FIG. 19 and of FIG. 20. Further, the processing flows of the area monitor processing 304 and the path setting processing 305 are described with reference to a flowchart of FIG. 21.

<Processing Flow Example of Network Management Server 9>

Figure 19:
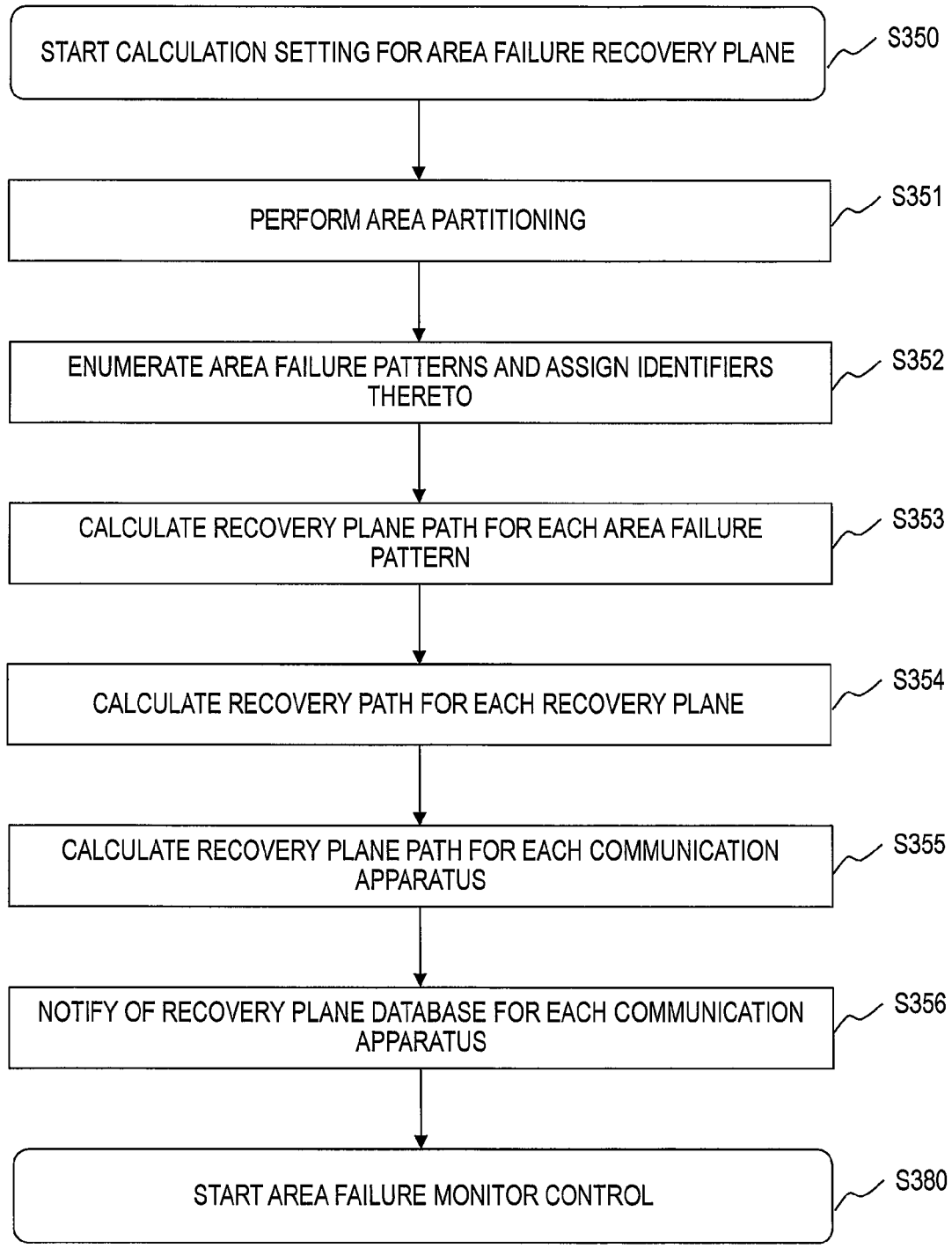
FIG. 19 is a flowchart illustrating a processing procedure example of the calculation of a failure recovery plane and recovery plane information notification to the respective communication apparatus that are executed by the network management server according to the first embodiment.

FIG. 19 is a flowchart illustrating a processing procedure example of the calculation of a failure recovery plane and recovery plane information notification to the respective communication apparatus that are executed by the network management server 9 according to the first embodiment. This flowchart is a preprocessing for area-basis failure monitor control. The network management server 9 (CPU 91) loads the program stored in the storage 93 onto the memory 92 to execute the program, and starts calculation setting for an area failure recovery plane (Step S350).

In accordance with the input from the network administrator, the network management server 9 performs area partitioning collectively for each plurality of communication apparatus forming the communication system to be managed (Step S351). It should be noted that, for example, the network management server 9 performs the area partitioning by using positional information held by the communication apparatus. In the first embodiment, the communication apparatus are partitioned into areas in accordance with the input from the network administrator, but partitioning of areas may be stored in a storage or the like as a database in advance.

The network management server 9 enumerates the area failure patterns after Step S351, and assigns the recovery plane ID to each thereof (Step S352). In the first embodiment, the management is carried out by partitioning into the eight areas, and hence the recovery plane IDs are assigned so as to correspond to two hundred fifty-six patterns in total.

The network management server 9 calculates, after Step S352, the path setting for the recovery plane for each area failure pattern shown in FIG. 5 (Step S353). The network management server 9 calculates, after Step S353, the path setting for each recovery plane shown in FIG. 6 to FIG. 9 (Step S354). The network management server 9 calculates, after Step S354, the path setting for each communication apparatus and for each recovery plane shown in FIG. 10 to FIG. 16 (Step S355).

The network management server 9 notifies the respective communication apparatus of a recovery plane database for each communication apparatus calculated in Step S355 (Step S356). The network management server 9 starts, after Step S356, a process for the area-basis failure monitor control (Step S380).

Figure 20:
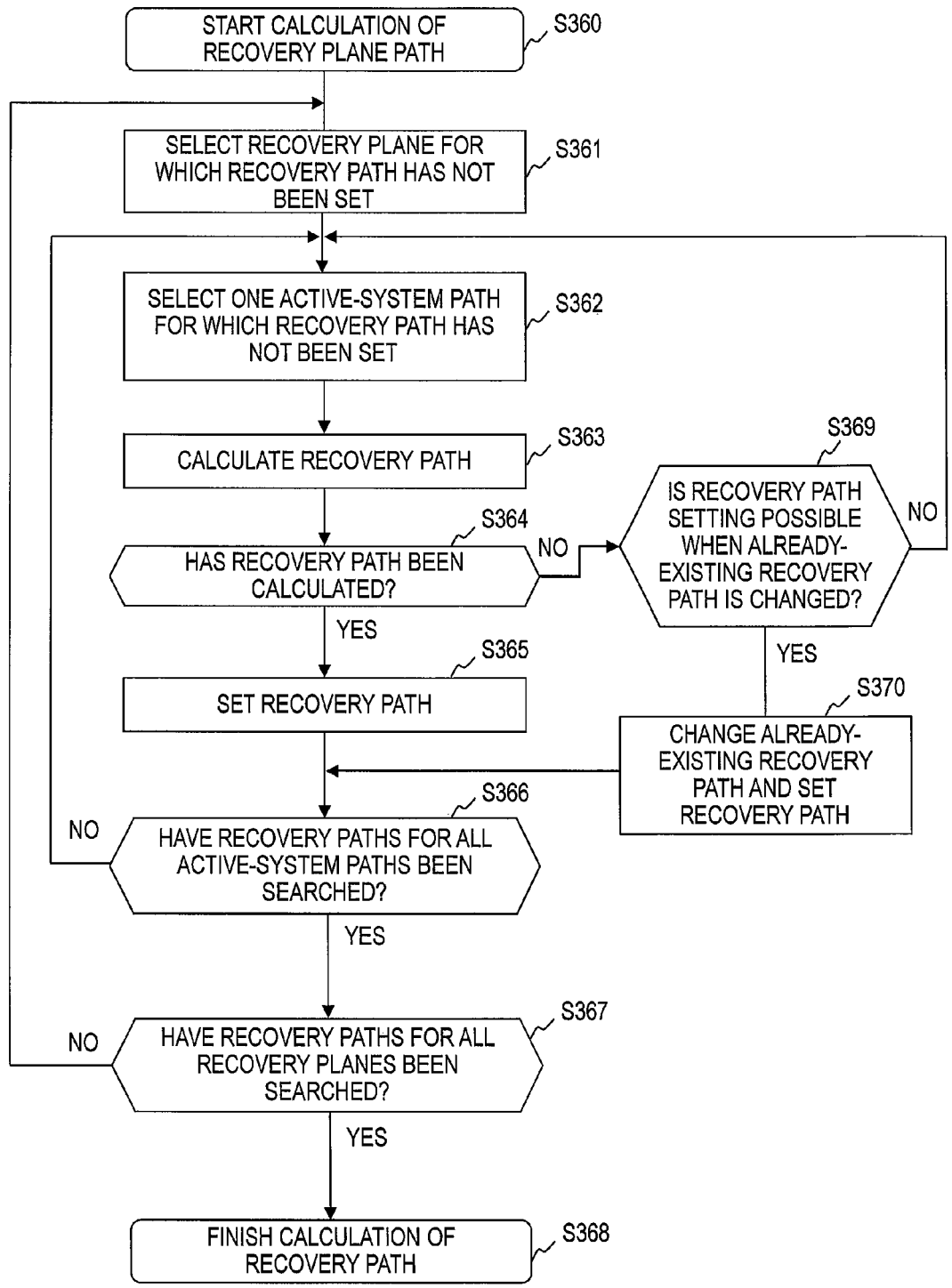
FIG. 20 is a flowchart illustrating a detailed processing procedure example of recovery path calculation processing executed by the network management server according to the first embodiment.

FIG. 20 is a flowchart illustrating a detailed processing procedure example of recovery path calculation processing (Step S353) executed by the network management server 9 according to the first embodiment. The network management server 9 starts calculation of a recovery plane path for each area failure pattern (Step S360). The network management server 9 selects, after Step S360, one recovery plane for which a recovery path has not been set (Step S361).

The network management server 9 selects one active-system path for which a recovery path has not been set for the recovery plane selected in Step S361 (Step S362). As a selection method, the selection may be performed in descending order of priority. Further, the selection may be performed in descending order of priority of a bandwidth necessary for the path, or another method using, for example, a priority based on a service contract may be used.

The network management server 9 executes processing for calculating the recovery path for the active-system path selected in Step S362 (Step S363). In the calculation of the recovery path, processing for calculating the transmission path for the recovery is executed so as to avoid passing through the area in which a failure occurrence is assumed and so as to minimize the hop count within a range of the paths that can secure the necessary bandwidth.

The network management server 9 determines whether or not the recovery path has been successfully calculated in the processing of Step S363 (Step S364). When it is determined in Step S364 that the recovery path has been successfully calculated (Step S364: Yes), the calculated path is set as the recovery path (Step S365). Subsequently to Step S365, the network management server 9 determines whether or not the recovery paths for all the paths set for the active system have been searched (Step S366).

When it is determined in Step S366 that recovery path searches have not been completed for all the paths for the active system (Step S366: No), the procedure returns to Step S362 to continue the processing. When it is determined in Step S366 that the recovery path searches have been completed for all the paths for the active system (Step S366: Yes), it is determined whether or not the recovery path searches have been completed for all the recovery planes (Step S367).

When it is determined in Step S367 that the recovery path searches have not been completed for all the recovery planes (Step S367: No), the procedure returns to Step S361 to continue the processing. When it is determined in Step S367 that the recovery path searches have been completed for all the recovery planes (Step S367: Yes), the recovery path calculation processing for each recovery plane is finished (Step S368), and the processing of Step S354 illustrated in FIG. 19 is started.

When it is determined in Step S364 that the recovery path has not been successfully calculated (Step S364: No), it is determined whether or not the recovery path can be calculated through the change of an already-existing recovery path (Step S369). In the calculation of the recovery path (Step S363), for example, the transmission path for the recovery is calculated so as to avoid passing through the area in which a failure occurrence is assumed, so as to be able to secure the necessary bandwidth, and so as to minimize the hop count.

In contrast, in Step S369, the network management server 9 attempts to change the already-existing recovery path calculated in the calculation of the recovery path (Step S363) so as to avoid passing through the area in which a failure occurrence is assumed and so as to secure the necessary bandwidth, to thereby determine whether or not the recovery path after the change can be calculated. It is preferred that the hop count be minimized, but the hop count that is not minimized may be allowed. In the case where the already-existing recovery path has been changed, the calculation of the recovery path (Step S369) is executed for the currently-selected active-system path. When it is determined in Step S369 that the recovery path cannot be calculated (Step S369: No), the processing of Step S362 is executed.

When it is determined in Step S369 that the recovery path can be calculated (Step S369: Yes), the recovery path after the change for the currently-processed active-system path is calculated by changing the already-existing recovery path, and sets the calculated path as the recovery path (Step S370), to continue the processing of Step S366.

Figure 21:
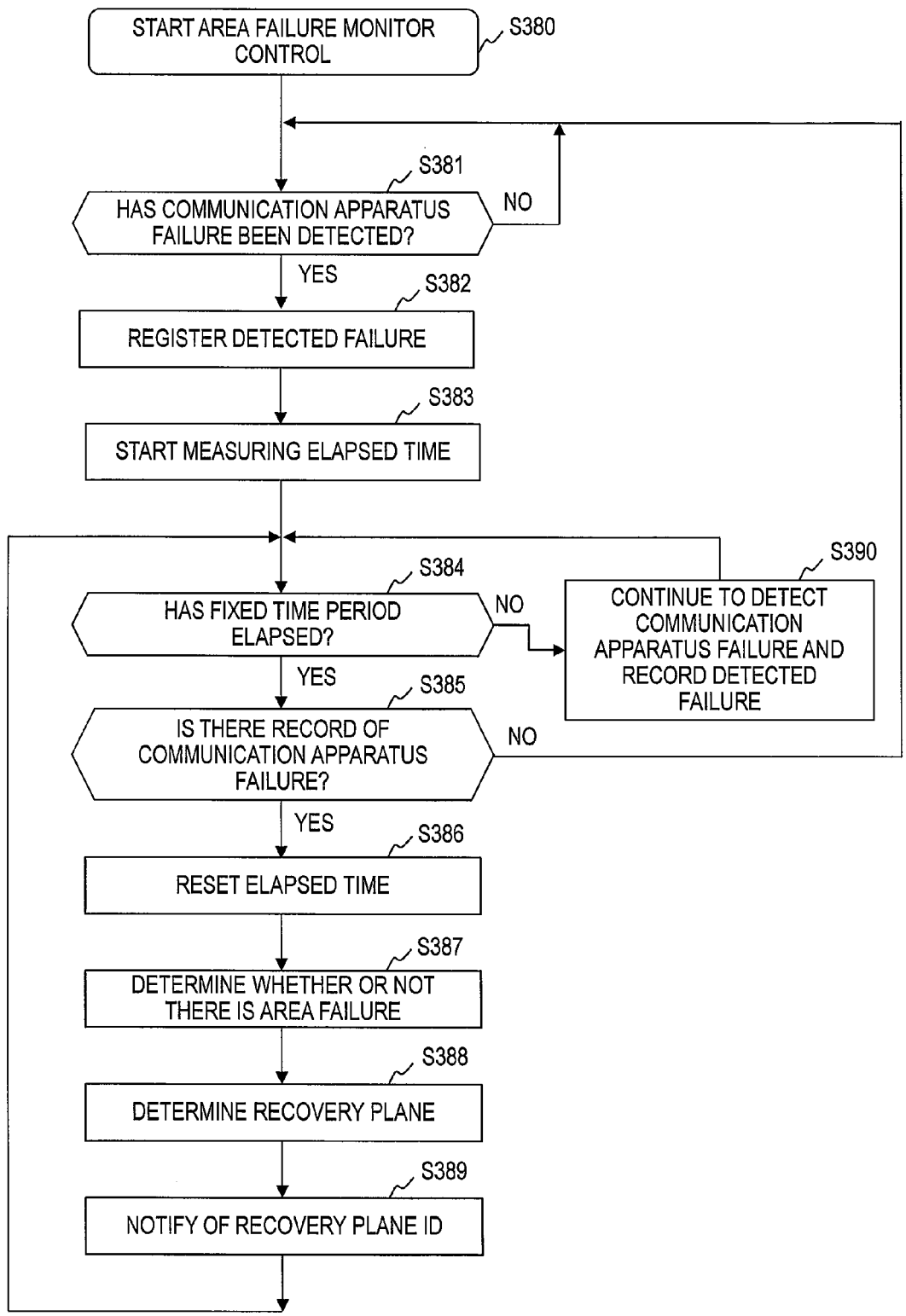
FIG. 21 is a flowchart illustrating a detailed processing procedure example of the monitor of the failure and recovery plane notification that are executed by the network management server according to the first embodiment.

FIG. 21 is a flowchart illustrating a detailed processing procedure example of the monitor of the failure and recovery plane notification that are executed by the network management server 9 according to the first embodiment. After notifying the respective communication apparatus of recovery path setting information for each recovery plane, the network management server 9 starts failure monitor control processing in units of areas and units of operation states of the respective communication apparatus (Step S380).

After starting the processing of Step S380, the network management server 9 detects whether or not a failure has occurred in the communication apparatus (Step S381). In the first embodiment, in the failure monitor of the communication apparatus, it is determined that, when there is no response from a communication apparatus being monitored, a failure has occurred in the communication apparatus.

When it is determined in Step S381 that a failure has not been detected in the communication apparatus, the failure detection processing for the communication apparatus is continued. When it is determined in Step S381 that a failure has been detected in the communication apparatus, the network management server 9 holds detected communication apparatus failure information (Step S382).

Subsequently to Step S382, the network management server 9 starts measuring time from the first failure occurrence (Step S383). Subsequently to Step S383, the network management server 9 determines whether or not a fixed time period, for example, 10 seconds has elapsed (Step S384). In the first embodiment, 10 seconds is set as the fixed time period, but another value, for example, a value such as 1 second or 1 minute may be set. By thus performing the determination within a fixed time period, the recovery can be performed collectively even when failures have occurred in a plurality of areas within the fixed time period.

When it is determined in Step S384 that the fixed time period has not elapsed, the network management server 9 continues to detect whether or not a failure has occurred in another communication apparatus, and when a failure has been detected, registers the failure information (Step S390). When it is determined in Step S384 that the fixed time period has elapsed, the network management server 9 determines whether or not there is a failure detection record of the communication apparatus (Step S385).

When it is determined in Step S385 that there is no failure detection record of the communication apparatus, the network management server 9 returns to Step S381 to continue the processing. When it is determined in Step S385 that there is a failure detection record of the communication apparatus, the network management server 9 resets the record of the elapsed time (Step S386).

Subsequently to Step S386, the network management server 9 determines whether or not there is an area failure based on the record of the detected communication apparatus failure (Step S387). The network management server 9 determines the recovery plane based on the determined area failure information (Step S388). The network management server 9 notifies the respective transmission apparatus of the ID of the determined recovery plane (Step S389), and returns to Step S384 to continue the processing.

<Hardware Configuration Example of Communication Apparatus>

Figure 22:
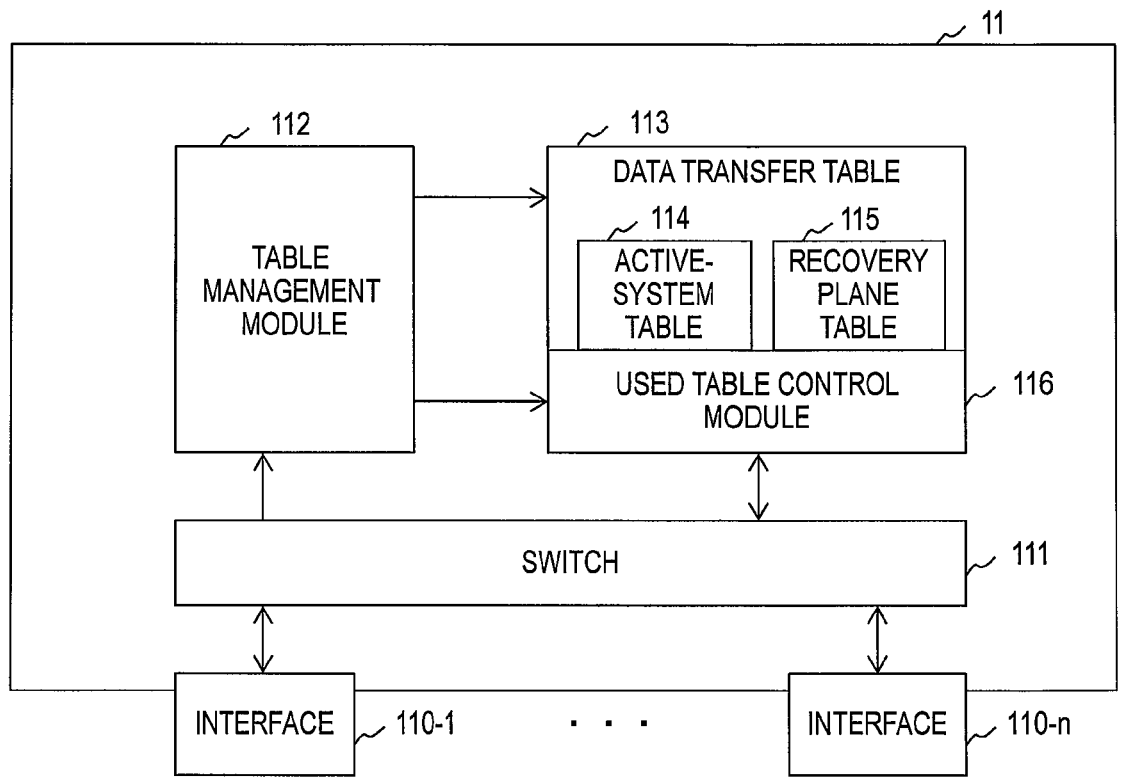
FIG. 22 is a block diagram illustrating a hardware configuration example of the communication apparatus according to the first embodiment.

FIG. 22 is a block diagram illustrating a hardware configuration example of the communication apparatus (11, 12, 13, 14, 21, 22, 23, 24, 31, 32, 33, 34, 41, 42, 43, 44, 51, 52, 61, 62, 71, 72, 81, and 82) according to the first embodiment. The communication apparatus includes network interfaces 110-1 to 110-n, a switch 111, a table management module 112, a data transfer table 113, and a used table control module 116. Further, the data transfer table 113 includes an active-system table 114 showing active-system path settings and a recovery plane table 115 showing path settings within the recovery plane.

The communication apparatus receives data for the path setting and the recovery plane ID through the network interfaces 110. When receiving data for transfer, the switch 111 switches the data to a network interface of an output destination based on an active-system table for data transfer. On the other hand, when the received data is the data for the path setting and the recovery plane ID, the communication apparatus switches the received data to the table management module 112. When the received data is the path setting, the table management module 112 updates the active-system table 114 or the recovery plane table 115. For example, the recovery path setting list table for each apparatus (FIG. 10 to FIG. 16) is stored in the recovery plane table 115.

On the other hand, when the received data is the recovery plane ID for notifying of the recovery plane, the table management module 112 notifies the used table control module 116 of the received recovery plane ID. The used table control module 116 updates the active-system table used by the switch 111 for transfer of received data to a transfer table indicated by the recovery plane ID based on the recovery plane ID received from the table management module 112.

In this manner, according to the first embodiment, the recovery path at the occurrence of the failure is calculated before the failure occurrence, and hence an optimal recovery path can be calculated with much time to spare. Further, the calculated recovery path is delivered to each communication node before the failure occurrence, and hence the recovery path can be notified of without any influence of the failure. In addition, when a failure occurs, the recovery path setting of which each node has been notified is used, and hence the path in which the failure has occurred can be recovered quickly. Further, a recovery notification for instructing a plurality of apparatus to recover the path in which a failure has occurred can be transmitted from the network management server at one time by the same instruction, which allows a quick path recovery notification.

Second Embodiment

A communication system according to a second embodiment of this invention is different from the communication system according to the first embodiment in that area management servers 1 to 8 are provided to the respective areas. It should be noted that the other components are the same. The same components as those of the first embodiment are denoted by the same reference symbols, and descriptions thereof are omitted.

<Network Configuration Example>

Figure 23:
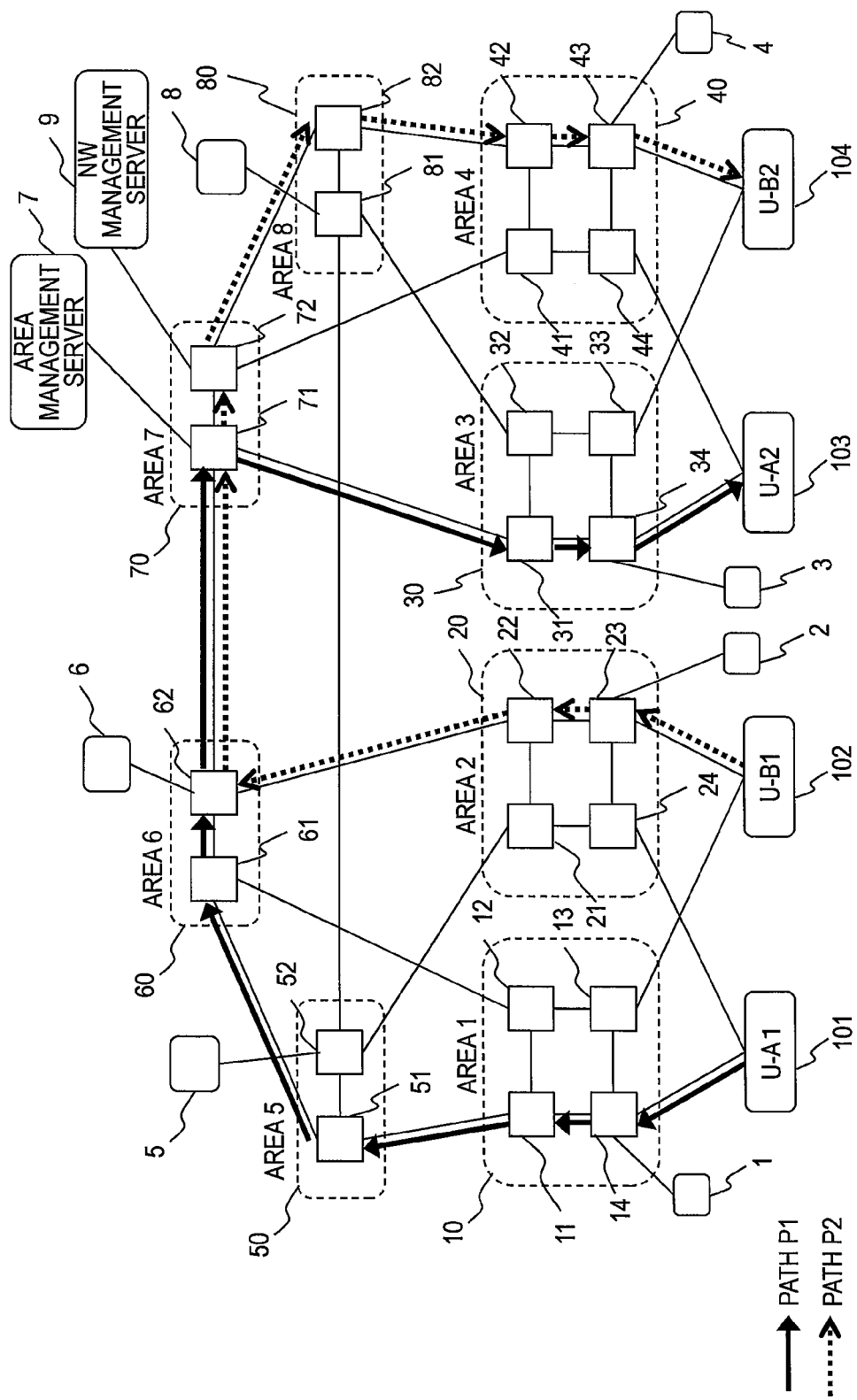
FIG. 23 is an explanatory diagram illustrating a system configuration example of the communication system according to the second embodiment.

FIG. 23 is an explanatory diagram illustrating a system configuration example of the communication system according to the second embodiment. Before starting the operation of the communication system, the network management server 9 notifies the area management servers 1 to 8 and the terminals of the path settings for the recovery planes corresponding to all the area failure patterns along with the recovery plane IDs. The area management servers 1 to 8 and the terminals hold the received recovery plane IDs and the received recovery path settings corresponding to the respective communication apparatus within the areas.

Figure 24:
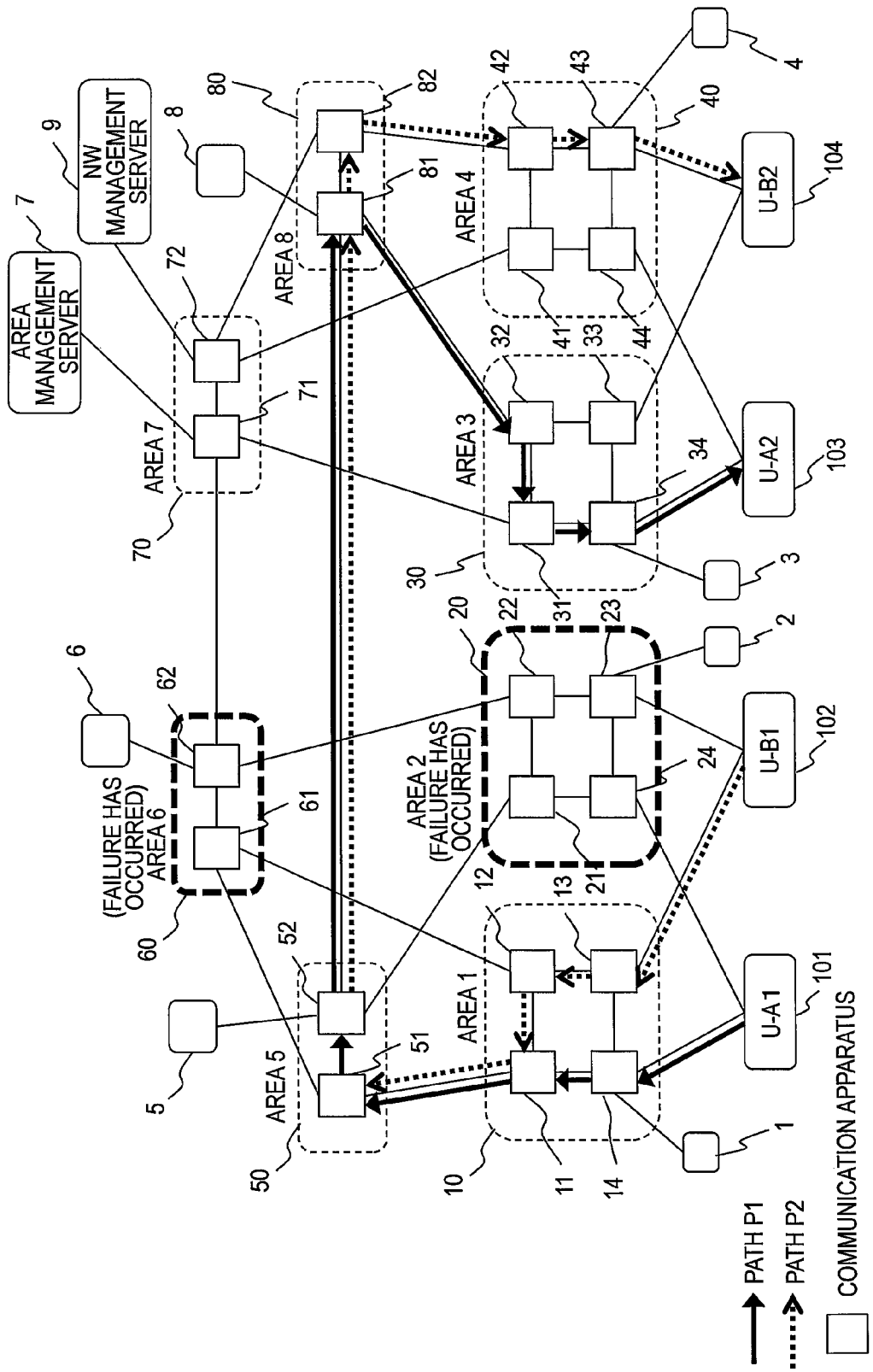
FIG. 24 is an explanatory diagram illustrating a system configuration example of the communication system after the failure recovery according to the second embodiment.

FIG. 24 is an explanatory diagram illustrating a system configuration example of the communication system after the failure recovery according to the second embodiment. In the first embodiment, the network management server 9 directly monitors and determines the failure in units of communication apparatus and in units of areas, but in the second embodiment, the area management servers 1 to 8 monitor and determine the failure in units of communication apparatus and in units of areas.

After determining the failure in units of areas, the area management servers 1 to 8 notify the network management server 9 of a result of the determination. The network management server 9 determines the recovery plane based on the received area failure information, and notifies the area management servers and the terminals of the recovery plane ID. Based on the received recovery plane ID, the area management servers 1 to 8 notify the respective communication apparatus within the area of the recovery path setting corresponding to the respective communication apparatus. Each of the communication apparatus executes the transmission of the received data in accordance with the setting of the recovery path notified of. Further, the terminal carries out the switching of the communication apparatus for a data transmission/reception destination based on the recovery plane ID received in the same manner.

<Failure Recovery Sequence Example>

Figure 25:
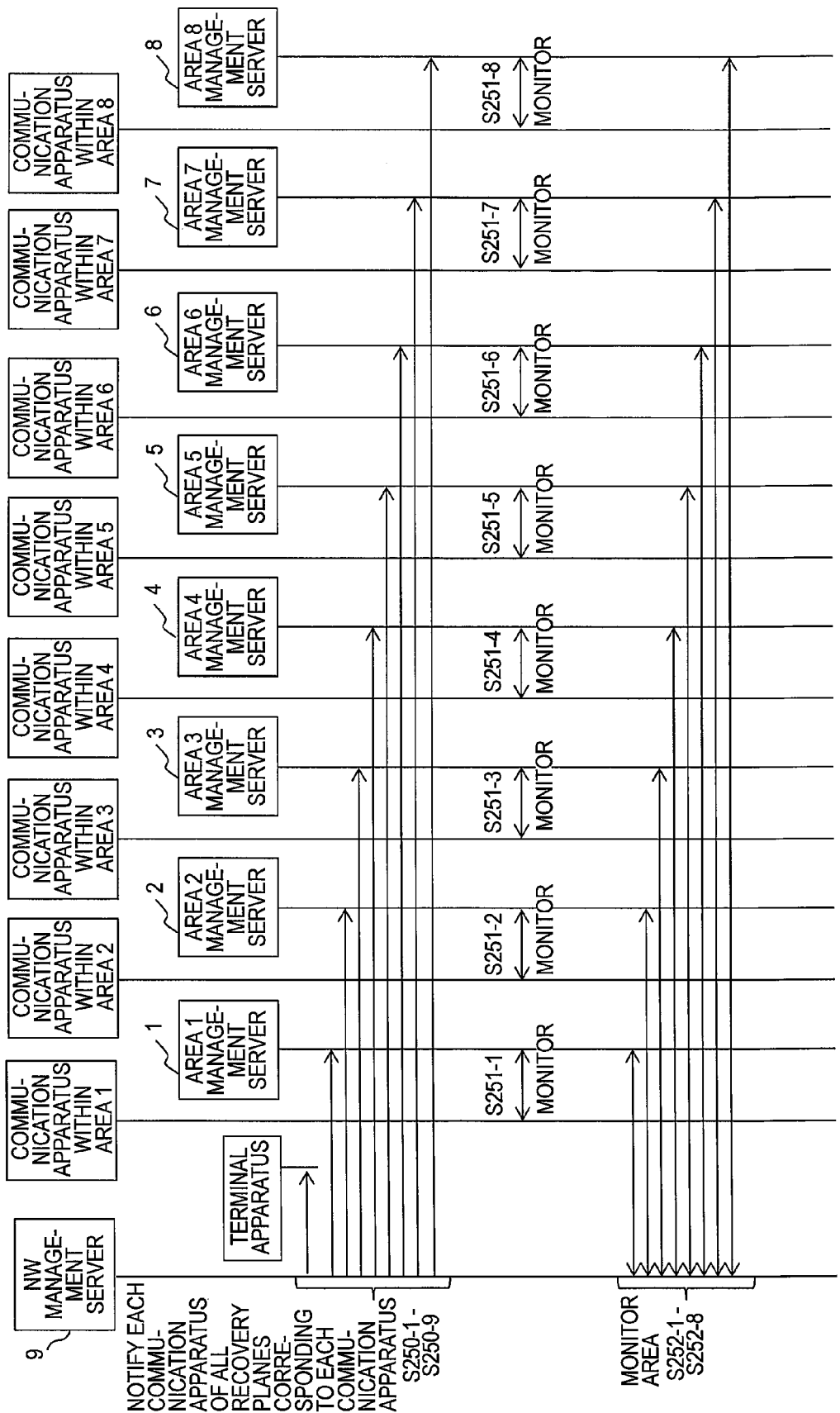
FIG. 25 is a sequence diagram (first half) illustrating a flow of the failure recovery according to the second embodiment.

FIG. 25 is a sequence diagram (first half) illustrating a flow of the failure recovery according to the second embodiment. It should be noted that the sequence from the input of a path request (Step S201) to the calculation of the recovery plane for each communication apparatus (Step S206) is the same as the sequence of the first embodiment illustrated in FIG. 3, and hence a description thereof is omitted.

After that, the network management server 9 notifies the area management servers 1 to 8 and the terminals of the path settings for the respective calculated recovery planes for each communication apparatus along with the recovery plane IDs (Steps S250-1 to S250-9). The area management servers 1 to 8 within the respective areas monitor whether or not a failure has occurred in the respective communication apparatus within the own area (Steps 251-1 to 251-8). The network management server 9 monitors the area failure information transmitted from the respective area management servers (Steps S252-1 to S252-8).

Figure 26:
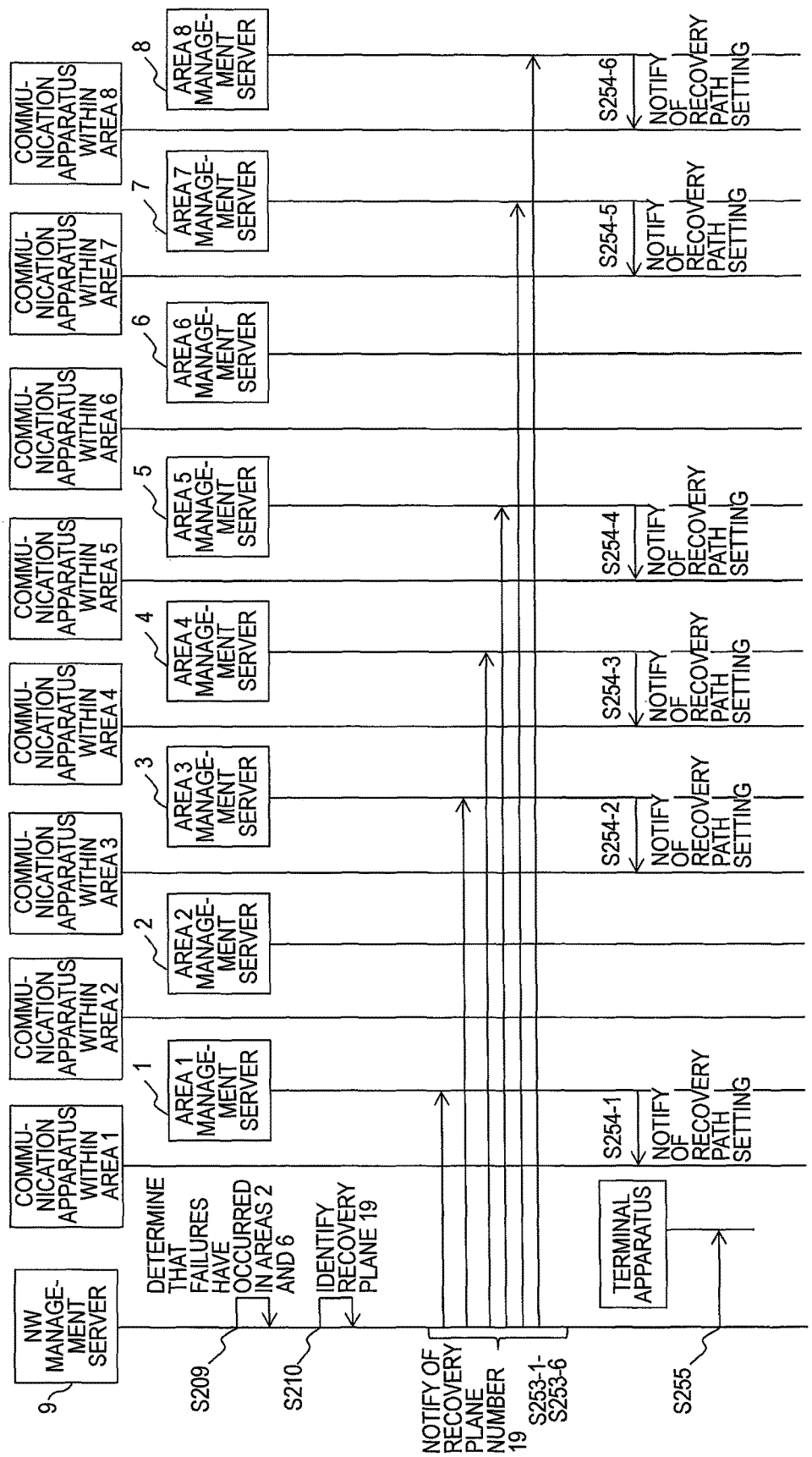
FIG. 26 is a sequence diagram (second half) illustrating a flow of the failure recovery according to the second embodiment.

FIG. 26 is a sequence diagram (second half) illustrating a flow of the failure recovery according to the second embodiment. Subsequently to Step S252, the network management server 9 determines the occurrence of a failure in units of areas (Step S209), and identifies the recovery plane (Step S210). The network management server 9 notifies the area management server necessary to recover the path of the identified recovery plane ID (Steps S253-1 to S253-6). The area management server that has received the notification notifies the respective communication apparatus within the own area of the recovery path settings corresponding to the communication apparatus based on the recovery plane ID (Steps S254-1 to S254-6). The network management server 9 notifies the terminal apparatus necessary to recover the path of the identified recovery plane ID (Step 255). Subsequently to Step S255, the respective transmission apparatus perform transmission/reception of data in accordance with the recovery path settings.

Figure 27:
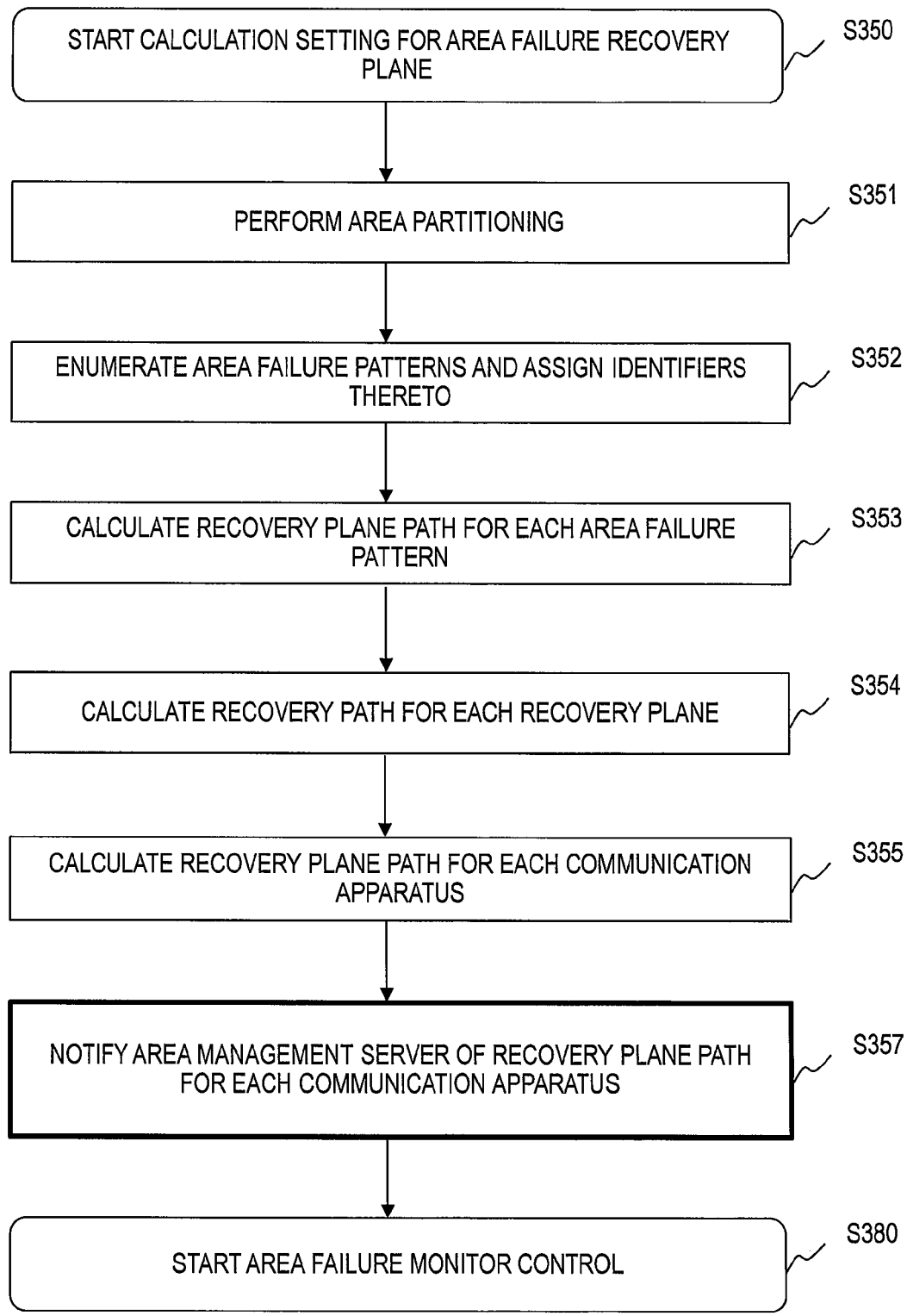
FIG. 27 is a flowchart illustrating a processing procedure example of the calculation of the failure recovery plane and the recovery plane information notification to the respective area management servers that are executed by the network management server according to the second embodiment.

FIG. 27 is a flowchart illustrating a processing procedure example of the calculation of the failure recovery plane and the recovery plane information notification to the respective area management servers that are executed by the network management server 9 according to the second embodiment. In the first embodiment illustrated in FIG. 19, the network management server 9 notifies the respective communication apparatus of information on a recovery plane path for each communication apparatus, but the second embodiment is different from the first embodiment in that the network management server 9 notifies the area management servers of the information. The same processing as that of FIG. 19 is denoted by the same step number, and a description thereof is omitted. The second embodiment is different from the first embodiment in that, as indicated in Step S357, the network management server 9 notifies the area management servers 1 to 8 of the information on the recovery plane paths for each communication apparatus along with the recovery plane IDs.

Figure 28:
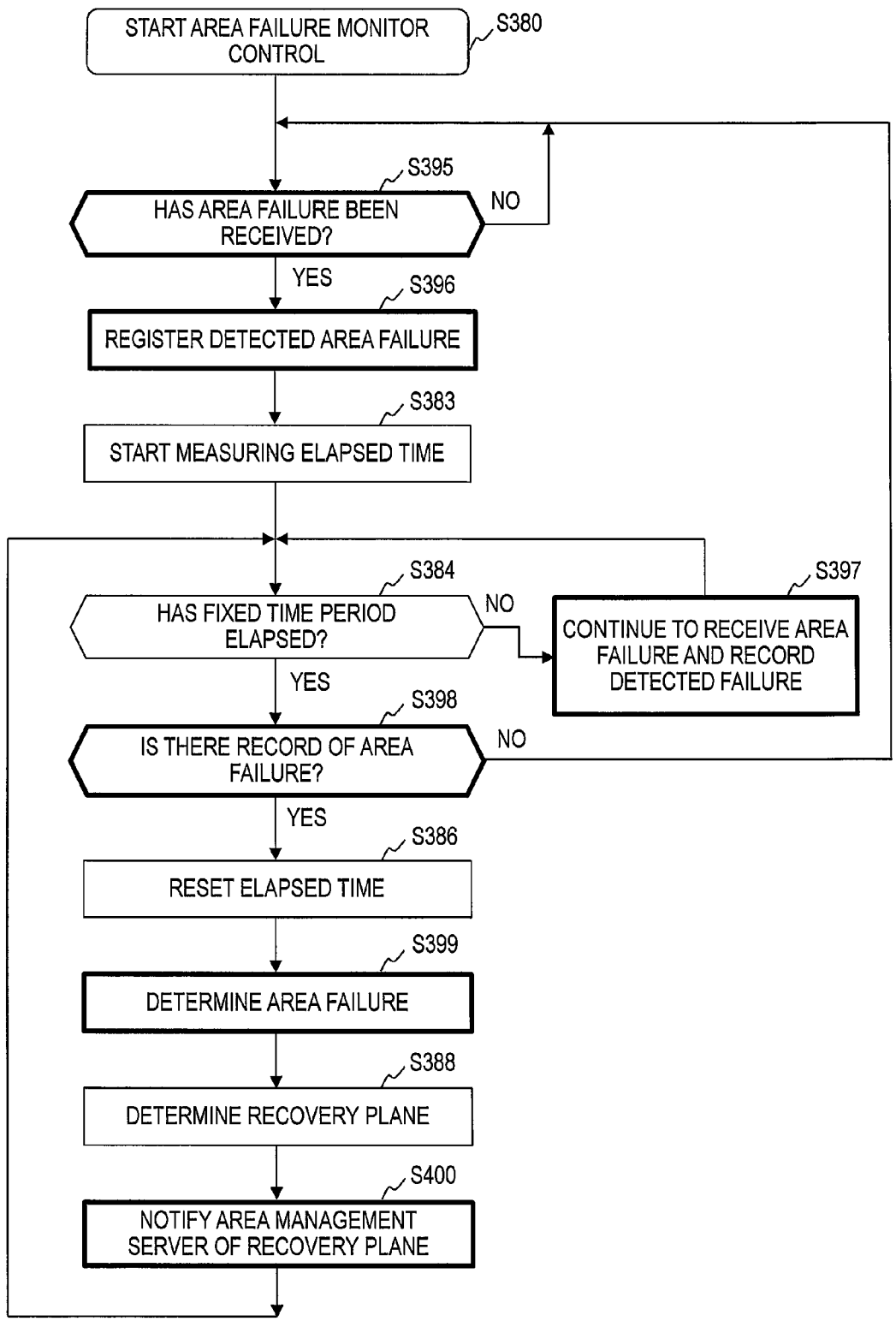
FIG. 28 is a flowchart illustrating a processing procedure example of the monitor of the failure and recovery plane notification that are executed by the network management server 9 according to the second embodiment.

FIG. 28 is a flowchart illustrating a processing procedure example of the monitor of the failure and recovery plane notification that are executed by the network management server 9 according to the second embodiment. In the first embodiment illustrated in FIG. 21, the network management server 9 directly monitors the failure in the communication apparatus, but in the second embodiment, the network management server 9 executes the monitor of the respective communication apparatus and the area failure through the intermediation of the area management server. The same processing as that of FIG. 21 is denoted by the same step number.

The network management server 9 notifies the respective area management servers of the recovery path setting information for each recovery plane, and then starts failure monitor control processing in units of areas (Step S380). After starting the processing of Step S380, the network management server 9 detects whether or not a failure has occurred in a monitored area (Step S395). In the second embodiment, the network management server 9 detects the area failure based on a failure notification in units of areas received from the area management server. Further, when there is no response from the area management server, the network management server 9 determines that a failure has occurred in the area corresponding thereto.

When it is determined in Step S395 that a failure has not been detected in the monitored area (Step S395: No), the network management server 9 continues the failure detection processing for the monitored area. When it is determined in Step S395 that a failure has been detected in the monitored area (Step S395: Yes), the network management server 9 holds detected area failure information (Step S396).

Subsequently to Step S396, the network management server 9 starts measuring time from the first area failure occurrence (Step S383). Subsequently to Step S383, the network management server 9 determines whether or not a fixed time period, for example, 10 seconds has elapsed (Step S384). In the second embodiment, 10 seconds is set as the fixed time period, but another value, for example, a value such as 1 second or 1 minute may be set.

When it is determined in Step S384 that the fixed time period has not elapsed (Step S384: No), the network management server 9 continues to detect whether or not a failure has occurred in another area, and when a failure has been detected, registers the failure information (Step S397), to return to Step S384.

When it is determined in Step S384 that the fixed time period has elapsed (Step S384: Yes), the network management server 9 determines whether or not there is a record of area failure detection (Step S398). When it is determined in Step S398 that there is no record of the area failure detection (Step S398: No), the network management server 9 returns to Step S395 to continue the processing.

When it is determined in Step S398 that there is a record of the area failure detection (Step S398: Yes), the network management server 9 resets the record of the elapsed time (Step S386). Subsequently to Step S386, the network management server 9 determines whether or not there is an area failure for all the areas based on the record of the detected area failure (Step S399). The network management server 9 determines the recovery plane based on the determined area failure information (Step S388). The network management server 9 notifies the area management servers and the terminals of the determined recovery plane ID (Step S400), and returns to Step S384 to continue the processing.

Figure 29:
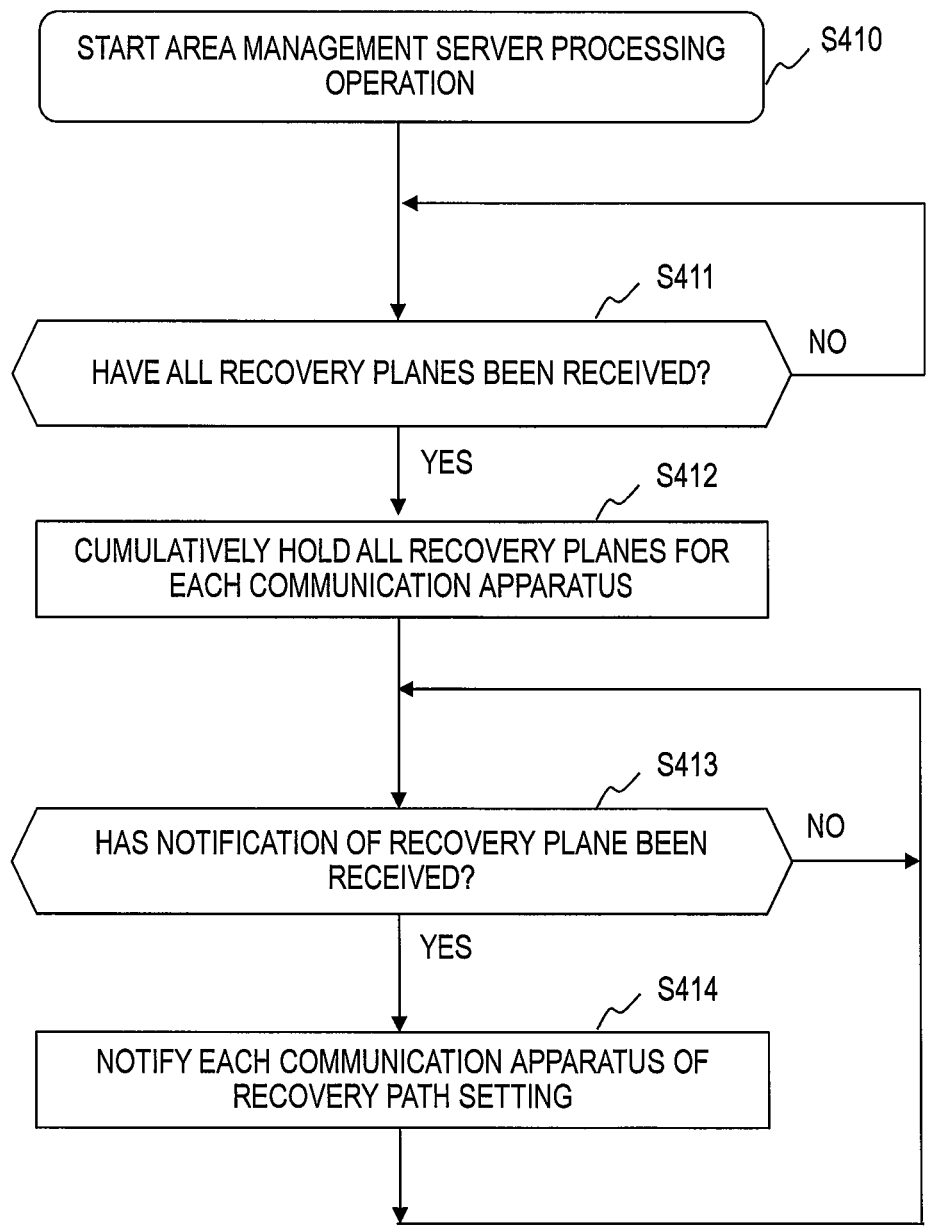
FIG. 29 is a flowchart illustrating a processing procedure example of processing in which the area management servers notify the respective communication apparatus of the recovery path according to the second embodiment.

FIG. 29 is a flowchart illustrating a processing procedure example of processing in which the area management servers 1 to 8 notify the respective communication apparatus of the recovery path according to the second embodiment. When an area management server processing program is started (Step S410), the area management servers 1 to 8 determine whether or not the recovery path setting information for each communication apparatus within the own area and the recovery plane IDs have been received (Step S411).

When it is determined in Step S411 that the recovery path setting information for each communication apparatus and the recovery plane IDs have not been received (Step S411: No), the area management servers 1 to 8 continue the processing of Step S411. When it is determined in Step S411 that the recovery path setting information for each communication apparatus and the recovery plane IDs have been received (Step S411: Yes), the received data is updated and held (Step S412).

Subsequently to Step S412, the area management servers 1 to 8 determine whether or not the recovery plane ID for area failure recovery has been received (Step S413). When it is determined in Step S413 that the recovery plane ID has not been received (Step S413: No), the processing of Step S413 is continued. When it is determined in Step S413 that the recovery plane ID has been received (Step S413: Yes), the area management servers 1 to 8 identify the recovery path settings corresponding to the respective communication apparatus within the own area based on the recovery plane ID, and notify the respective communication apparatus thereof (Step S414). Subsequently to Step S414, the processing of Step S413 is continued.

Figure 30:
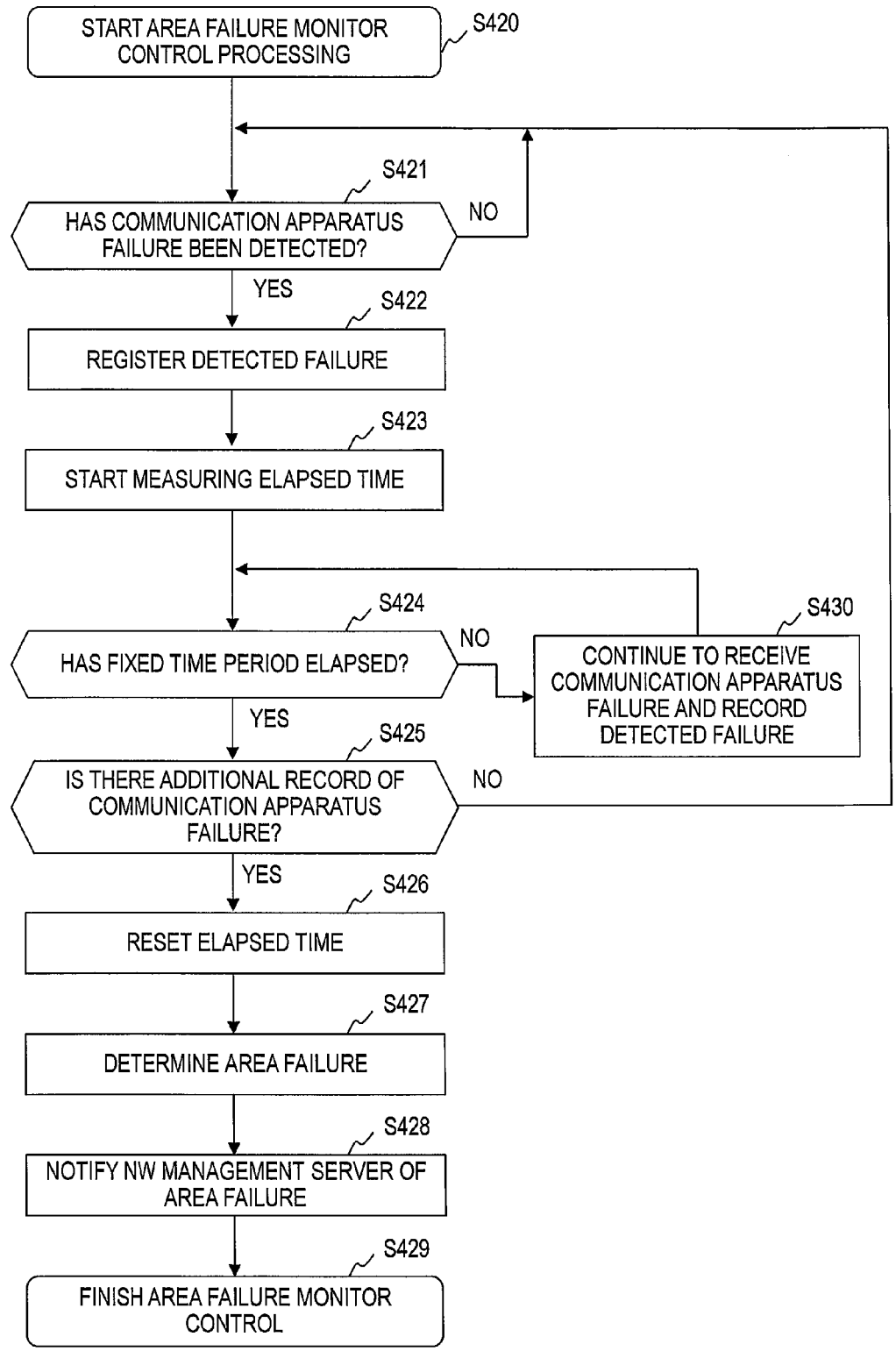
FIG. 30 is a flowchart illustrating a processing procedure example of a failure monitor processing operation executed by the area management server according to the second embodiment.

FIG. 30 is a flowchart illustrating a processing procedure example of a failure monitor processing operation executed by the area management server according to the second embodiment. The area management servers 1 to 8 activate the area management server processing program to start area failure monitor control processing (Step S420). Subsequently to Step S420, the area management servers 1 to 8 detect whether or not a failure has occurred in the communication apparatus within the own area (Step S421). In the second embodiment, in the failure monitor of the communication apparatus, it is determined that, when there is no response from a communication apparatus being monitored, a failure has occurred in the communication apparatus.

When it is determined in Step S421 that a failure has not occurred in the communication apparatus (Step S421: No), the area management servers 1 to 8 continue the failure detection processing for the communication apparatus. When it is determined in Step S421 that a failure has been detected in the communication apparatus (Step S421: Yes), the area management servers 1 to 8 hold the detected communication apparatus failure information (Step S422).

Subsequently to Step S422, the area management servers 1 to 8 start measuring time from the first failure occurrence (Step S423). Subsequently to Step S423, the area management servers 1 to 8 determine whether or not a fixed time period, for example, 10 seconds has elapsed (Step S424). In the second embodiment, 10 seconds is set as the fixed time period, but another value, for example, a value such as 1 second or 1 minute may be set.

When it is determined in Step S424 that the fixed time period has not elapsed (Step S424: No), the area management servers 1 to 8 continue to detect whether or not a failure has occurred in another communication apparatus, and when a failure has been detected, register the failure information (Step S430), to return to Step S424. When it is determined in Step S424 that the fixed time period has elapsed (Step S424: Yes), the area management servers 1 to 8 determine whether or not there is a failure detection record of the communication apparatus (Step S425).

When it is determined in Step S425 that there is no failure detection record of the communication apparatus (Step S425: No), the area management servers 1 to 8 return to Step S421 to continue the processing. When it is determined in Step S425 that there is a failure detection record of the communication apparatus (Step S425: Yes), the area management servers 1 to 8 reset the record of the elapsed time (Step S426).

Subsequently to Step S426, the area management servers 1 to 8 determine whether or not there is an area failure based on the record of the detected communication apparatus failure (Step S427). The area management servers 1 to 8 notify the network management server 9 of the determined area failure information (Step S428), to finish area failure monitor control processing (Step S429). When the network management server 9 is notified of the area failure information (Step S428), the network management server 9 determines that an area failure has occurred as indicated in Step S209 of FIG. 26.

In this manner, according to the second embodiment, in the same manner as in the first embodiment, the recovery path at the occurrence of the failure is calculated before the failure occurrence, and hence an optimal recovery path can be calculated with much time to spare. Further, in the same manner as in the first embodiment, the calculated recovery path is delivered to each communication node before the failure occurrence, and hence the recovery path can be notified of without any influence of the failure. Further, by providing the respective areas with the area management servers 1 to 8 to notify the area management servers 1 to 8, instead of the communication apparatus, of the recovery path, it is possible to achieve load balancing of the network management server 9.

Further, in the same manner as in the first embodiment, when a failure occurs, the recovery path setting of which each node has been notified is used, and hence the path in which the failure has occurred can be recovered quickly. Further, a recovery notification for instructing the area management servers 1 to 8 to recover the path in which a failure has occurred can be transmitted from the network management server at one time by the same instruction. In other words, it is not necessary to notify the individual communication apparatus, and hence it is possible to achieve the load balancing of the network management server 9.

Third Embodiment

A third embodiment of this invention relates to an example in which a function that enables independent failure recovery within the area is added to the second embodiment.

Figure 31:
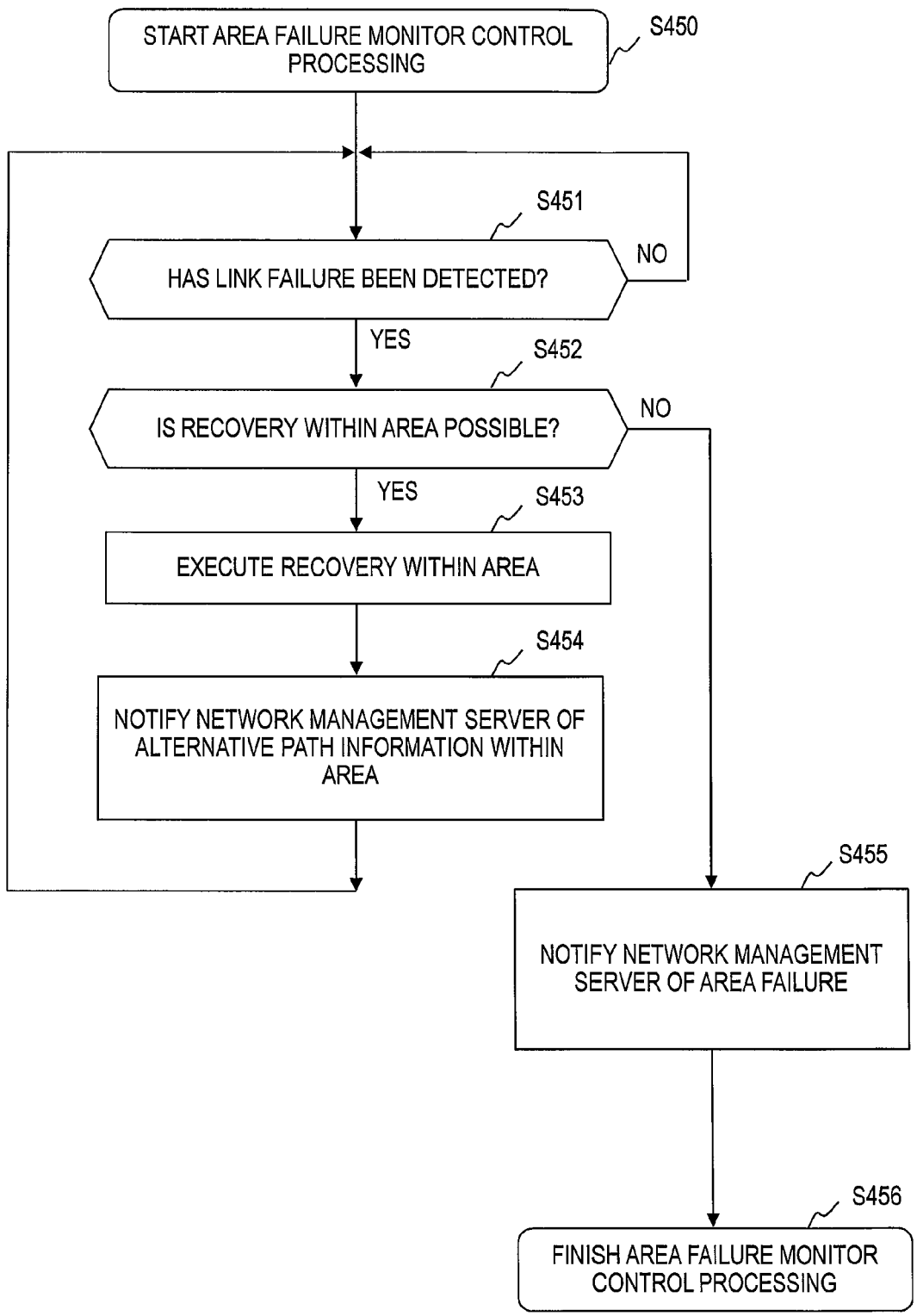
FIG. 31 is a flowchart illustrating a processing procedure example for the path recovery within the area according to the third embodiment.

FIG. 31 is a flowchart illustrating a processing procedure example for the path recovery within the area according to the third embodiment. In the third embodiment, the area management servers 1 to 8 activate the area management server processing program to start the area failure monitor control processing (Step S450). Subsequently to Step S450, the area management servers 1 to 8 determine whether or not a notification of a link failure has been received from the communication apparatus within the area (Step S451). When it is determined in Step S451 that the link failure has not been detected (Step S451: No), the area management servers 1 to 8 continue the processing of Step S451.

When it is determined in Step S451 that the link failure has been detected (Step S451: Yes), the area management servers 1 to 8 determine whether or not the independent recovery is possible within the area (Step S452). When it is determined in Step S452 that the recovery within the area is possible (Step S452: Yes), the area management servers 1 to 8 execute the recovery within the area (Step S453).

In the determination of Step S452, the area management servers 1 to 8 may determine that the independent recovery is impossible within the area only by, for example, detecting a link failure. Further, even when there is a link failure, in a case where an alternative path exists within the area, the area management servers 1 to 8 may determine that the recovery is possible.

Subsequently to Step S453, the area management servers 1 to 8 notify the network management server 9 of alternative path information within the area (Step S454). The alternative path information includes the information on the path before bypassing and the path after bypassing within the area. The network management server 9 corrects the information on the active-system path based on the alternative path information. For example, when a communication apparatus that forms the path before bypassing exists in the transmission paths P1 and P2 of the recovery plane ID of "0", the network management server 9 corrects a content of the recovery setting to the path after bypassing. In the same manner, the network management server 9 corrects the recovery plane list table 500 of FIG. 5 and entries of the recovery plane ID of "0" shown in FIG. 10 to FIG. 16 based on the alternative path information.

Subsequently to Step S454, the area management servers 1 to 8 return to Step S451 to continue the processing. When it is determined in Step S452 that the recovery within the area is impossible (Step S452: No), the area management servers 1 to 8 notify the network management server 9 of the area failure (Step S455), to finish the area failure monitor control processing (Step S456). When the network management server 9 is notified of the area failure information (Step S456), the network management server 9 determines that an area failure has occurred as indicated in Step S209 of FIG. 26.

In this manner, according to the third embodiment, the failure occurrence can be determined within the area, and it is possible to achieve reduction in load on the network management server 9. It should be noted that the third embodiment can also be applied to the first embodiment. In this case, the network management server 9 executes the processing of FIG. 31.

Fourth Embodiment

The description of the second embodiment is directed to the example in which the network management server 9 notifies the area management servers 1 to 8 of the recovery plane ID, and the area management servers 1 to 8 identify the recovery path setting corresponding to the respective communication apparatus within the own area based on the recovery plane ID, and notify the respective communication apparatus of the recovery path setting. In a fourth embodiment of this invention, the network management server 9 notifies the respective communication apparatus of the recovery plane ID, and the respective communication apparatus execute processing for receiving the recovery path settings for the respective communication apparatus from the area management servers 1 to 8.

In this manner, according to the fourth embodiment, the communication apparatus receives the recovery plane ID, and hence can transmit a request for acquiring the recovery path setting to the corresponding one of the area management servers 1 to 8. Therefore, when the recovery path setting cannot be received even though the request for acquiring the recovery path setting is transmitted, the communication apparatus can determine that a failure has occurred in the corresponding one of the area management servers 1 to 8. In this case, the communication apparatus notifies the network management server 9 of the failure information on the area management server. Based on this notification, the network management server 9 determines that a failure has occurred in the area, and the recovery can be performed as described above.

Fifth Embodiment

In the second to fourth embodiments, the network management server 9 selects the recovery plane based on the failure occurrence in units of areas. In a fifth embodiment of this invention, the area management servers 1 to 8 exchange the failure occurrence information in units of areas with one another or confirm operations of one another, and the area management server itself determines the failure occurrences in units of areas within all the areas, and selects the recovery plane.

In this manner, according to the fifth embodiment, the same effect can be produced as the effect described in the second to fourth embodiments. Further, the management for each area can be realized in an autonomous distributed manner.

It should be noted that the above-mentioned embodiments are described by taking the example in which the recovery is performed in units of areas, but the recovery may be performed in units of communication apparatus.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A network management system, comprising:
a network management server to be coupled to a plurality of communication apparatuses within respective areas of an area group forming a network, the network management server comprising:
a processor for executing a program;
a memory for storing the program to be executed by the processor;
an interface for controlling communications to/from each of the communication apparatuses; and
a storage for storing data, wherein:
the storage stores, information for defining the network as a combination of a plurality of areas,
the storage stores, for each combination of failure occurrence areas when a failure has occurred in one or more areas among the plurality of areas: information for identifying a recovery plane indicating a set of recovery paths which do not pass through the failure occurrence areas corresponding to one or more transmission paths which passes through the failure occurrence areas; and information for identifying the communication apparatus through which each of the recovery paths passes, in association with each other;
the network management server executes:
sending recovery information to each communication apparatus to store the recovery information to each communication apparatus, the recovery information includes information for identifying the recovery plane in which one or more recovery paths passing through the communication apparatus is included; and information for designating the other communication apparatuses coupled to the communication apparatus in the one or more recovery paths;

identifying, when a plurality of failure occurrences are detected in the plurality of areas, any one of the combinations of the failure occurrence areas;

identifying the recovery plane corresponding to the identified combination of the failure occurrence areas; and notifying one or more communication apparatuses through which the one or more recovery paths included in the recovery plane passes of the identified recovery plane.

2. The network management server according to claim 1, wherein the network management server executes:

determining whether a failure has occurred in any one of the plurality of areas, recording, when a failure occurs in any one of the plurality of areas, for each failure occurrence, the area as the failure occurrence area; and when a failure has been determined to occur in an area of the any one of the plurality of areas, begin measuring an elapsed time from a first failure occurrence in the area, determine, whether the elapsed time from the first failure occurrence exceeds a predetermined time, if the elapsed time has exceeded the predetermined time, identifying the combination of the failure occurrence areas in accordance with the combination of one or more failure occurrences recorded.

3. The network management server according to claim 2, wherein the network management server executes:

determining, when a failure has occurred in the communication apparatus within any one of the plurality of areas, whether or not the any one of the plurality of areas corresponds to the failure occurrence area to store the failure occurrence area to the storage.

4. The network management server according to claim 3, wherein the network management server executes:

determining the any one of the plurality of areas as the failure occurrence area when a link to another area, which is provided to the any one of the communication apparatus within the any one of the plurality of areas, becomes disabled.

5. The network management server according to claim 3, wherein the network management server executes:

determining the any one of the plurality of areas as the failure occurrence area based on a number of communication apparatus in each of which a failure has occurred within the any one of the plurality of areas.

6. The network management server according to claim 2, wherein the network management server executes:

determining, when the network management server detects the communication apparatus in which a failure has occurred within the any one of the plurality of areas, in a case where the network management server is settable to an alternative path that avoids passing through the communication apparatus in which the failure has occurred within the any one of the plurality of areas for the transmission path that passes through the communication apparatus in which the failure has occurred, that the area does not correspond to the failure occurrence area.

7. A network management server to be coupled to area management servers for managing respective areas of an area group forming a network, the network management server comprising:

a processor for executing a program;

a memory for storing the program to be executed by the processor;

an interface for controlling communications to/from each of the area managing servers; and a storage for storing data, wherein:

the storage stores, information for defining the network as combinations of a plurality of areas, the storage stores, for each combination of failure occurrence areas when a failure has occurred in one or more areas among the plurality of areas: information for identifying a recovery plane indicating a set of recovery paths which do not pass through the failure occurrence areas corresponding to one or more transmission paths which passes through the failure occurrence areas; and information for identifying the communication apparatus through which each of the recovery paths passes, in association with each other;

the network management server executes:

sending recovery information to each area management server to store the recovery information to each area management server, the recovery information includes information for identifying the recovery plane in which one or more recovery paths passing through the communication apparatus is included; and information for designating the other communication apparatuses coupled to the communication apparatus in the one or more recovery paths;

identifying, when a plurality of failure occurrences are detected in the plurality of areas, any one of the combinations of the failure occurrence areas;

identifying the recovery plane corresponding to the identified combination of the failure occurrence areas; and notifying one or more area management servers for an area through which the one or more recovery paths included in the recovery plane passes of the identified recovery plane.

8. The network management server according to claim 7, wherein the network management server executes:

determining whether a failure has occurred in any one of the plurality of areas, recording, when a failure occurs in any one of the plurality of areas, for each failure occurrence, the area as the failure occurrence area; and when a failure has determined to occur in an area of the any one of the plurality of areas, begin measuring an elapsed time from a first failure occurrence in the area, determine, whether the elapsed time from the first failure occurrence exceeds a predetermined time, if the elapsed time has exceeded the predetermined time identifying the combination of the failure occurrence areas in accordance with combination of one or more failure occurrences recorded.

9. The network management server according to claim 7, wherein the network management server executes:

determining, when a failure has occurred in the communication apparatus within any one of the plurality of areas, whether or not the any one of the plurality of areas corresponds to the failure occurrence area to store the failure occurrence area to the storage.

10. The network management server according to claim 8, wherein the network management server executes:

determining the any one of the plurality of areas as the failure occurrence area when a link to another area, which is provided to the any one of the communication apparatus within the any one of the plurality of areas, becomes disabled.

11. The network management server according to claim 8, wherein the network management server executes:
determining the any one of the plurality of areas as the failure occurrence area based on a number of communication apparatus in each of which a failure has occurred within the any one of the plurality of areas.

12. The network management server according to claim 7, wherein the network management server executes:
determining, when the network management server detects the communication apparatus in which a failure has occurred within the any one of the plurality of areas, in a case where the network management server is settable an alternative path that avoids passing through the communication apparatus in which the failure has occurred within the any one of the plurality of areas for the transmission path that passes through the communication apparatus in which the failure has occurred, that the area does not correspond to the failure occurrence area.

13. A recovery method to be executed by a network management server to be coupled to communication apparatus within respective areas of an area group forming a network,
the network management server comprising:
a processor for executing a program;
a memory for storing the program to be executed by the processor;
an interface for controlling communications to/from the communication apparatus; and
a storage for storing data,
the storage storing, information for defining the network as combinations of a plurality of areas,
the storage storing, for each combination of failure occurrence areas when a failure has occurred in one or more areas among the plurality of areas: information for identifying a recovery plane indicating a set of recovery paths which do not pass through the failure occurrence areas corresponding to one or more transmission paths which passes through the failure occurrence areas; and information for identifying the communication apparatus through which each of the recovery paths passes, in association with each other;
the recovery method comprising executing, by the network management server:
sending recovery information to each communication apparatus to store the recovery information to each communication apparatus, the recovery information includes information for identifying the recovery plane in which one or more recovery paths passing through the communication apparatus is included; and information for designating the other communication apparatuses coupled to the communication apparatus in the one or more recovery paths;
identifying, when a plurality of failure occurrences are detected in the plurality of areas, any one of the combinations of the failure occurrence areas;
identifying the recovery plane corresponding to the identified combination of the failure occurrence areas; and
notifying one or more communication apparatuses through which the one or more recovery paths included in the recovery plane passes of the identified recovery plane.

\* \* \* \* \*